US011755018B2

(12) United States Patent
Zeng et al.

(10) Patent No.: US 11,755,018 B2
(45) Date of Patent: Sep. 12, 2023

(54) END-TO-END INTERPRETABLE MOTION PLANNER FOR AUTONOMOUS VEHICLES

(71) Applicant: UATC, LLC, Mountain View, CA (US)

(72) Inventors: Wenyuan Zeng, Toronto (CA); Wenjie Luo, Mountain View, CA (US); Abbas Sadat, Toronto (CA); Bin Yang, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 501 days.

(21) Appl. No.: 16/541,739

(22) Filed: Aug. 15, 2019

(65) Prior Publication Data

US 2020/0159225 A1 May 21, 2020

Related U.S. Application Data

(60) Provisional application No. 62/768,847, filed on Nov. 16, 2018.

(51) Int. Cl.
*G05D 1/02* (2020.01)
*G05D 1/00* (2006.01)
(Continued)

(52) U.S. Cl.
CPC ............ *G05D 1/0212* (2013.01); *G01C 21/32* (2013.01); *G01C 21/3453* (2013.01); *G05D 1/0088* (2013.01); *G05D 2201/0213* (2013.01)

(58) Field of Classification Search
CPC ............... G05D 1/0212; G05D 1/0088; G05D 2201/0213; G01C 21/32; G01C 21/3453
See application file for complete search history.

(56) References Cited

U.S. PATENT DOCUMENTS 10,713,794 B1 * 7/2020 He ..................... G06N 3/0454
2019/0025853 A1 * 1/2019 Julian ................... G06V 10/25
(Continued)

OTHER PUBLICATIONS

Ajanovic et al., "Search-Based Optimal Motion Planning for Automated Driving", arXiv:1803v2, Aug. 3, 2018, 8 pages.
(Continued)

*Primary Examiner* — James M McPherson
*Assistant Examiner* — Bakari Underwood
(74) *Attorney, Agent, or Firm* — Dority & Manning, P.A.

(57) ABSTRACT

Systems and methods for generating motion plans including target trajectories for autonomous vehicles are provided. An autonomous vehicle may include or access a machine-learned motion planning model including a backbone network configured to generate a cost volume including data indicative of a cost associated with future locations of the autonomous vehicle. The cost volume can be generated from raw sensor data as part of motion planning for the autonomous vehicle. The backbone network can generate intermediate representations associated with object detections and objection predictions. The motion planning model can include a trajectory generator configured to evaluate one or more potential trajectories for the autonomous vehicle and to select a target trajectory based at least in part on the cost volume generate by the backbone network.

20 Claims, 10 Drawing Sheets

(51) Int. Cl.
G01C 21/32 (2006.01)
G01C 21/34 (2006.01)

(56) References Cited

U.S. PATENT DOCUMENTS

| | | | | |
|---|---|---|---|---|
| 2019/0050000 | A1* | 2/2019 | Kennedy | G06T 7/277 |
| 2019/0384303 | A1* | 12/2019 | Muller | G01C 21/3407 |
| 2019/0391580 | A1* | 12/2019 | Di Cairano | G05D 1/0217 |
| 2020/0139967 | A1* | 5/2020 | Beller | B60W 30/143 |

OTHER PUBLICATIONS

Bandyopadhyay et al., "Intention-Aware Motion Planning", Algorithmic Foundations of Robotics, Feb. 14, 2013, 16 pages.
Bojarski et al., "End to End Learning for Self-Driving Cars", arXiv:1604v1, Apr. 25, 2016, 9 pages.
Buehler et al., "The DARPA Urban Challenge: Autonomous Vehicles in City Traffic", vol. 56, 116 pages.
Casas et al., "Intentnet: Learning to Predict Intention from Raw Sensor Data", Conference on Robot Learning, Oct. 29-31k, 2018, Zurich, Switzerland, 10 pages.
Chen et al., "DeepDriving: Learning Affordance for Direct Perception in Autonomous Driving", Conference on Computer Vision, Dec. 11-18, 2015, Las Condes, Chile, 9 pages.
Chen et al., "Constrained iterative LGR for On-Road Autonomous Driving Motion Planning", Conference on Intelligent Transportation Systems, Oct. 16-19, 2017, Yokohama, Japan, 7 pages.
Codevilla et al., "End-to-End Driving via Conditional Imitation Learning", arXiv: 1710v2, Mar. 2, 2018, 8 pages.
Dosovitskiy etal, "CARLA: An Open Urban Driving Simulator", arXiv:1711v1, Nov. 10, 2017, 16 pages.
Fan et al., "Baidu Apollo EM Motion Planner", arXiv:1807, Jul. 20, 2018, 15 pages.
Fraichard et al., "Path-Velocity Decomposition Revisited and Applied to Dynamic Trajectory Planning", Conference on Robotics and Automation, May 2-7, 1993, Atlanta, Georgia, 7 pages.
Hardy et al., "Contingency Planning Over Probabilistic Obstacle Predictions for Autonomous Road Vehicles", Transaction on Robotics, vol. 29, No. 4, Aug. 2013, pp. 913-929.
Howard et al., "MobileNets: Efficient Convolutional Neural Networks for Mobile Vision Applications", arXiv:1704v1, Apr. 17, 2017, 9 pages.
Kant et al., "Toward Efficient Trajectory Planning: The Path-Velocity Decomposition", The International Journal of Robotics Research, vol. 5, No. 3, 1986, pp. 72-89.
Kendall, "Learning to Drive in a Day", arXiv:1807v2, Sep. 11, 2018, 7 pages.
Liu etal, "SSD: Single Shot Multibox Detector", arXiv:1512v5, Dec. 29, 2016, 17 pages.
Luo et al., "Understanding the Effective Receptive Field in Deep Convolutional Neural Networks", Conference on Neural Information Processing Systems, Dec. 5-10, 2016, Barcelona, Spain, 9 pages.
Luo et al., "Fast and Furious: Real Time End-to-End 3D Detection, Tracking and Motion Forecasting with a Single Convolutional Net", Conference on Computer Vision and Pattern Recognition, Jun. 18-22, 2018, pp. 3569-3577.
McNaughton, "Parallel Algorithms for Real-Time Motion Planning", Carnegie Mellon University, Thesis Proposal, 2009, 65 pages.
Montemerlo et al., "Junior: The Stanford Entry in the Urban Challenge", Journal of Field Robotics, vol. 25, No. 9, 2008, 31 pages.
Muller et al., "Driving Policy Transfer via Modularity and Abstraction", arXiv:1804v3, Dec. 13, 2015, 15 pages.
Paden et al., "A Survey of Motion Planning and Control Techniques for Self-Driving Urban Vehicles", arXiv:1604v1, Apr. 25, 2016, 27 pages.
Pan et al., "Virtual to Real Reinforcement Learning for Autonomous Driving", arXiv:1704v4, Sep. 26, 2017, 13 pages.
Pomerleau, "ALVINN: An Autonomous Land Vehicle in a Neural Network", Advances in Neural Information Processing Systems, 1989, pp. 305-313.
Rhinehart et al., "R2P2: A Reparameterized Pushforward Policy for Diverse, Precise Generative Path Forecasting", Conference on Computer Vision, Jan. 30-31, 2018, 17 pages.
Sauer et al., "Conditional Affordance Learning for Driving in Urban Environments", arXiv:1806v3, Nov. 3, 2018, 16 pages.
Schlechtriemen et al., "Wiggling through Complex Traffic: Planning Trajectories Constrained by Predictions", Intelligent Vehicles Symposium, Jun. 19-22, 2016, Gothenburg, Sweden, 8 pages.
Shin et al., "Path Generation for a Robot Vehicle using Composite Clothoid Segments", Intelligent Components and Instruments for Control Applications, vol. 25, Inssue 6, May 1992, pp. 443-448.
Silver et al., "Mastering the Game of Go Without Human Knowledge", Nature, vol. 550, No. 7676, Oct. 2017, 42 pages.
Werling et al., "Optimal Trajectory Generation for Dynamic Street Scenarios in a Frenet Frame", Conference on Robotics and Automation, May 3-8, 2010, Anchorage, Alaska, pp. 987-993.
Wulfmeier et al., "Maximum Entropy Deep Inverse Reinforcement Learning", arXiv:1507v3, Mar. 11, 2016, 10 pages.
Yang et al., "PIXOR: Real-Time 3D Object Detection from Point Clouds", Conference on Computer Vision, Jun. 18-22, 2018, Salt Lake City, Utah, pp. 7652-7660.
Zhan et al., "A Non-Conservatively Defensive Strategy for Urban Autonomous Driving", Conference on Intelligent Transportation Systems, Nov. 1-4, 2016, Rio de Janeiro, Brazil, pp. 459-464.
Zhao et al., "Pyramid Scene Parsing Network", arXiv:1612v2, Apr. 27, 2017, 11 pages.
Ziebart et al., "Maximum Entropy Inverse Reinforcement Learning", Conference on Artificial Intelligence, Jul. 13-17, 2008, Chicago, Illinois, pp. 1433-1438.
Ziegler et al., "Trajectory Planmng for Bertha—A Local, Continuous Method", IEEE Intelligent Vehicles Symposium (IV), Jun. 8-11, 2014, Dearborn, Michigan, 8 pages.

* cited by examiner

END-TO-END INTERPRETABLE MOTION PLANNER FOR AUTONOMOUS VEHICLES

RELATED APPLICATION

This application claims priority to and the benefit of U.S. Provisional Patent Application No. 62/768,847, titled "End-to-End Interpretable Neural Motion Planner," and filed on Nov. 16, 2018. U.S. Provisional Patent Application No. 62/768,847 is hereby incorporated by reference herein in its entirety.

FIELD

The present disclosure relates generally to improving the ability of computing devices to plan motion paths for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to an autonomous vehicle that includes one or more processors and one or more non-transitory computer-readable media that collectively store a machine-learned motion planning model that is configured to receive sensor data and map data associated with an environment external to an autonomous vehicle and process the sensor data and the map data to generate a target trajectory for the autonomous vehicle. The machine-learned motion planning model includes a backbone network configured to receive the sensor data and the map data and to generate a cost volume including data indicative of a cost associated with each of a plurality of future locations of the autonomous vehicle within a planning horizon. The backbone network is configured to generate one or more intermediate representations associated with at least one of an object detection or an objection prediction by the backbone network. The machine-learned motion planning model includes a trajectory generator configured to select a target trajectory for the autonomous vehicle based at least in part on the cost volume generated by the backbone network. The one or more non-transitory computer-readable media collectively store instructions that, when executed by the one or more processors, cause the one or more processors to perform operations. The operations include obtaining the sensor data and the map data, inputting the sensor data and the map data into the machine-learned motion planning model, and receiving the target trajectory as an output of the machine-learned motion planning model.

Another example aspect of the present disclosure is directed to one or more non-transitory computer-readable media that collectively store a machine-learned motion planning model. The machine-learned motion planning model includes a backbone network configured to receive sensor data and map data associated with an environment external to an autonomous vehicle and to generate a cost volume including data indicative of a cost associated with each of a plurality of future locations of the autonomous vehicle within a planning horizon. The backbone network is configured to generate one or more intermediate representations associated with at least one of an object detection or an objection prediction by the backbone network. The machine-learned motion planning model includes a trajectory generator configured to select a target trajectory for the autonomous vehicle based at least in part on the cost volume generated by the backbone network.

Yet another example aspect of the present disclosure is directed to a computer-implemented method of motion planning for an autonomous vehicle. The method includes obtaining, by a computing system comprising one or more computing devices, sensor data and map data associated with an environment external to the autonomous vehicle, generating, by the computing system using a backbone network of a machine-learned motion planning model, a cost volume indicative of a cost associated with each of a plurality of future locations of the autonomous vehicle, generating, by the computing system using the backbone network, one or more intermediate representations associated with one or more objects detected by the backbone network, and generating, by the computing system using a trajectory generator of the machine-learned motion planning model, a target trajectory for the autonomous vehicle based at least in part on the cost volume.

Other example aspects of the present disclosure are directed to systems, methods, vehicles, apparatuses, tangible, non-transitory computer-readable media, and memory devices for motion planning for autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
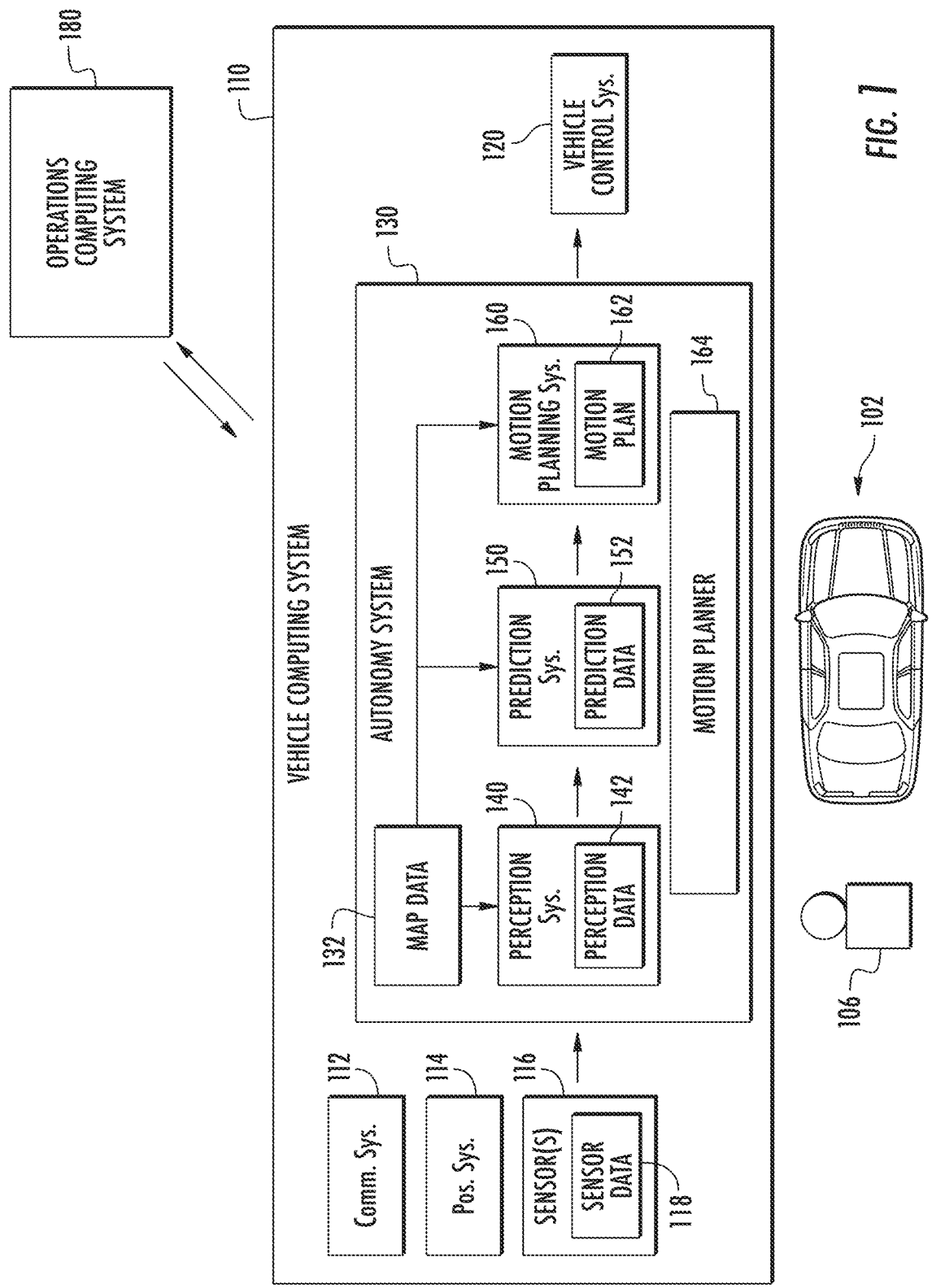
FIG. 1 depicts an example system overview including an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved systems and methods for motion planning in autonomous vehicles through the utilization of one or more machine-learned motion planning models. More particularly, a motion planning system for an autonomous vehicle is provided that includes at least one end-to-end learnable and interpretable motion planning model. For example, a machine-learned motion planning model in accordance with example embodiments may be configured to receive sensor data such as raw image data, light-detection and ranging (LIDAR) data, RADAR data, map data, etc., and to directly generate a motion plan for an autonomous vehicle based on the raw sensor data. The motion planning model in some examples may include a single neural network that takes raw sensor data and dynamic map data as an input, and predicts a cost map for motion planning as an output. The motion planning model may be configured to generate a target trajectory of a motion plan for an autonomous vehicle, as well as one or more intermediate representations of the environment external to the autonomous vehicle based on the sensor data. In this manner, the motion planning model may be trained end-to-end to provide motion planning for an autonomous vehicle based on raw sensor data, while also providing intermediate representations such as object detections and object predictions as an interpretable output. Accordingly, the motion planning model provides an end-to-end driving approach that is optimized for the motion planning task, while also providing intermediate representations that can be accessed to improve the effectiveness of the model, such as by training to optimize the intermediate representations for motion planning.

An autonomous vehicle (e.g., ground-based vehicle, aircraft, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, GPS, etc.), access map data associated with an environment external to the autonomous vehicle, and generate an appropriate motion plan through the vehicle's surrounding environment based on the sensor data and map data. To more accurately and efficiently generate a motion plan through the autonomous vehicle's surrounding environment, a machine-learned motion planning model that is trained end-to-end to generate motion plans based on input sensor data is provided according to example embodiments of the present disclosure.

The machine-learned motion planning model may be configured to generate a cost volume defining a cost of a plurality of positions or locations that an autonomous vehicle may take within a planning horizon. The cost volume may represent a measure of the desirability of each location or position that the autonomous vehicle may take. For example, the cost or other measure for a particular position may be indicative of a likelihood of safety or other parameter associated with the vehicle taking that position. A lower cost may be indicative of a lower likelihood of collision with another object at a particular location, for example, whereas a higher cost may be indicative of a higher likelihood of collision with another object at the particular location. Additionally, the machine-learned motion planning model may be configured to generate one or more interpretable immediate representations based on the sensor data, such as three-dimensional object detections and/or motion predictions for detected objects. The machine-learned motion planning model can select a target trajectory based on the cost volume for the future AV locations. In some examples, the model can sample a set of diverse physically possible trajectories for the autonomous vehicle and compute a score for a set of potential trajectories based on the cost volume. The model can select a target trajectory for the autonomous vehicle based on the trajectory scores for the set of potential trajectories. For example, the model can select the potential trajectory having the lowest trajectory score (also referred to as minimum cost) as the target trajectory for the autonomous vehicle. In other examples, the model can select the target trajectory by optimizing a potential trajectory, such as a randomly sampled trajectory, based on the cost volume generated by the backbone network. The machine-learned motion planning model is able to utilize a nonparametric cost volume that can capture the uncertainty and multimodality in possible AV trajectories, such as the uncertainty and multimodality in changing a lane versus staying in a lane. By utilizing a motion planner that includes an end-to-end machine-learned motion planning model, the motion planning system is capable of handling complex urban scenarios that include traffic light handling, yielding, and interactions with multiple road users.

In accordance with example embodiments of the disclosed technology, an end-to-end interpretable and learnable motion planning model can generate accurate three-dimensional trajectories for an autonomous vehicle over a planning horizon (e.g., a few seconds). The model can take as input LIDAR data such as one or more LIDAR point clouds, as well as map data such as data for a high-definition map. Other sensor data may be used in addition to or in place of LIDAR data, such as image data and/or RADAR data. The motion planning model can generate one or more interpretable intermediate representations in the form of three-dimensional object detections and/or future motion forecasts over the planning horizon for the three-dimensional object detections. In some examples, the interpretable intermediate representations are provided as a first output of the motion planning model. The motion planning model can additionally generate a space-time cost volume that represents a cost associated with all locations that the autonomous vehicle can take within the planning horizon. The space-time cost volume can be generated as a second output of the motion planning model in some examples. A target trajectory can be selected based on the space-time cost volume. For example, one or more trajectory proposals (also referred to as potential trajectories) can be scored using the learned cost volume so that the motion planner can select the trajectory proposal having the minimum cost. The trajectory proposal having the minimum cost can be provided as a third output of the motion planning model in some examples.

The model can be jointly trained such that the intermediate representations are optimized for the end task of motion planning. For instance, the machine-learned motion planning model can be jointly trained for both motion planning and generating the intermediate representations based on one or more optimization parameters for motion planning. In this manner, the motion planning model can provide interpretability and handle multimodality naturally. Moreover, the motion planning model can handle uncertainty naturally as this may be represented in the cost volume. In some examples, this approach can avoid costly parameter tuning by enabling the model to learn concepts that are difficult to specify by hand such as, "slowing down in approaching occlusion." Additionally, the motion planning model can be trained by back-propagating feedback from the motion planning system, such as to optimize objection detection and/or objection prediction.

In accordance with example embodiments, the machine-learned motion planning model can be trained end-to-end with a multitask objective. In some examples, the machine-learned motion planning model can be trained based at least in part on multitask training with supervision for both perception and motion planning. The machine-learned motion planning model can be trained using a total loss function that includes a perception loss component as well as a motion planning loss component. The planning loss can encourage the minimum cost plan selected by the model to be similar to a trajectory performed by a human demonstrator in some examples. A motion planning loss component can be generated based at least in part on one or more human-driven trajectories in some examples. Such a loss can be a sparse loss in some instances, as a ground truth trajectory may only occupy a small portion of the possible space. Because learning with a planning loss alone may be slow and difficult, embodiments of the disclosed technology may also utilize a perception loss that encourages the intermediate representations to produce accurate three-dimensional detections as well as motion forecasting. This can enable the interpretability of the intermediate representations and may enable faster training of the motion planning model.

In some examples, the perception loss component can include a classification loss and/or a regression loss. The classification loss can be utilized for distinguishing a vehicle from a background, while the regression loss can be used for generating precise object bounding boxes. For a predefined anchor box, the motion planning model can output a classification score as well as several regression targets. The classification score can indicate the probability of existence of a vehicle at a particular anchor box. A cross entropy loss can be used in some examples for the classification. The regression loss outputs can include information indicative of position, shape, and the heading angle at each of a plurality of time frames. The regression loss can be summed over all vehicle correlated anchor boxes, from the current time frame through a prediction horizon. In this manner, the regression loss can be used to train the model to predict the position of vehicles at every timeframe. Each anchor box can be associated to its neighboring ground truth bounding box in order to find a training label for each anchor box. Any non-assigned ground truth boxes can also be associated with their nearest neighbor.

The planning loss component can be trained utilizing a minimization of a max-margin loss where the ground truth trajectory is used as a positive training example, and randomly sampled trajectories are utilized as negative training examples. Such an approach can overcome the difficulty associated with learning a reasonable cost volume in situations where a ground truth cost volume is not available. The motion planning model can be trained to encourage the ground truth trajectory to have the minimum cost, and other trajectories to have higher costs. The discrepancy between the ground truth trajectory and a negative trajectory sample can be utilized during training. The distance between a negative trajectory and a ground truth trajectory can be used to encourage negative trajectories far from the ground truth trajectory to have a much higher cost. A discrepancy can be computed between the ground truth trajectory and each negative sample, followed by optimizing the worst case by the max operation. Such an approach may encourage the motion planning model to learn a cost volume that discriminates "good" trajectories from "bad" trajectories.

A machine-learned motion planning model in accordance with example embodiments may include a backbone network as well as a trajectory generator. The backbone network can be configured to take as input LIDAR data and map data in some examples, and provide as output one or more intermediate representations such as bounding boxes of other objects for future timesteps, as well as the cost volume for planning with a predetermined number of filters corresponding to the timesteps. In other examples, the backbone network may use image data and/or RADAR data, alone or in combination with LIDAR data. The trajectory generator can select a target trajectory for the autonomous vehicle based on the cost volume. For example, the trajectory generator can obtain a set of potential trajectories of the autonomous vehicle and generate a trajectory score for each potential trajectory using the cost volume from the backbone network. The trajectory generator can index the cost of each potential trajectory from different filters of the cost volume and sum them together to generate a trajectory score in some examples. The trajectory generator can select the trajectory with the minimum cost for final motion planning in some examples. In another example, the trajectory generator can optimize a single sampled trajectory using the cost volume. For example, the trajectory generator can include an optimizer that optimizes a sampled trajectory by minimizing the cost computed for the trajectory using the cost volume.

In accordance with some embodiments, the motion planning model can be configured to formulate a motion planning task as a deep structured minimization problem. The minimization can be approximated by sampling a set of physically valid trajectories, and picking the trajectory having the minimum cost using a cost volume. The cost volume can be a learned cost volume generated by a convolutional neural network backbone. The convolutional neural network can extract features from both the LIDAR data and the map data to generate a feature map.

A feature map may include one or more sensor features (e.g., LIDAR features) and one or more map features in some examples. In some examples, the LIDAR data can be rasterized into a three-dimensional occupancy grid, where each voxel has a binary value indicating whether it contains a LIDAR point. This can result in a three-dimensional tensor representing the height and x-y spatial dimensions of each LIDAR point, respectively. The map data can be utilized to provide accurate motion planning by enabling the autonomous vehicle to follow traffic rules and other external constraints, for example. In some examples, high-definition maps can contain information about the semantics of a scene, such as the location of a lane, the lane boundary shape (e.g., solid, dashed, etc.), and the location of signs (e.g, stop signs, etc.). The map data can be rasterized to form an M-channel tensor, where each channel represents a different map element, including road, intersections, lanes, lane boundaries, traffic lights, etc. The backbone network can include a plurality of blocks, were each block includes one or more convolutional layers. A multiscale feature map can be generated after a first portion of the blocks and then fed into a final block. In some examples, a feature map can include a three-dimensional LIDAR tensor as well as an M-channel map tensor.

The motion planning model can feed the feature map into two branches of convolutional layers that output the intermediate representations (e.g., three-dimensional detections and motion forecasting) and the cost volume, respectively. A first branch can be implemented as a perception header or model head including one or more classification layers and one or more regression layers. A second branch can be implemented as a cost volume header or model head including one or more deconvolution layers and one or more convolution layers. The perception header can be configured to generate one or more bounding boxes and/or motion forecasts corresponding to object detections based on the sensor data and/or map data. The cost volume header can be configured to generate a three-dimensional cost volume based on the sensor data and/or map data.

The perception header may include a classification component as well as a regression component according to some implementations. The two components may be formed of convolution layers in some examples. Multiple predefined anchor boxes (also referred to as anchors) can be defined at each feature map location. The different anchors at each location may include different sizes, aspect ratios, and orientation. The classification branch can output a score for each anchor indicating the probability of a vehicle or other object at each anchor's location. The regression branch can output regression targets for each anchor at different timesteps. This can include a localization offset size and a heading angle. Regression can be performed at each timestep to produce motion forecasting for each vehicle or other object. The cost volume header can include several convolution and deconvolution layers. A convolution layer may be utilized that includes a filter number over the planning horizon. Each filter can generate a cost volume for a future timestep. This enables the cost of any trajectory to be evaluated by simply indexing into the cost volume.

The trajectory generator can apply sampling or optimization to obtain a low-cost trajectory by sampling a wide variety of diverse trajectories that can be executed by the autonomous vehicle or optimizing one or more sampled trajectories. The trajectory generator can produce as output a target trajectory with a minimal cost according to the learned cost volume. In some examples, the trajectory generator can efficiently sample trajectories that are physically possible and evaluate the cost volume efficiently. A trajectory can be defined by the combination of a spatial path (e.g., a curve in the two-dimensional plane) and the velocity profile (e.g., how fast the autonomous vehicle goes along this path). To consider real-world constraints, the motion planning model can impose that the vehicle should follow a dynamical model. The motion planning model can generate a set of potential trajectories according to at least one of a speed constraint, an acceleration constraint, or a turning angle constraint defined by the dynamical model. Additionally, a planar curve such as a Clothoid curve, also known as Euler spiral or Cornu spiral, can be used to represent the two-dimensional path of the autonomous vehicle. Finally, a longitudinal velocity can be defined that specifies the autonomous vehicle motion along the autonomous vehicle path.

By utilizing planar curves, sampling a path of the autonomous vehicle can correspond to sampling according to a scaling factor based on velocity. The shape of the planar curve (e.g., Clothoid curve) can be fixed based on the scaling factor that is sampled, and the autonomous vehicle steering angle can be used to find a corresponding position on the curve. Constant accelerations can also be sampled which specify the autonomous vehicle's velocity profile. By combining the sampled curves and the velocity profiles, the trajectories can be projected into discrete timesteps, and the corresponding waypoint can be obtained for which to evaluate the learned cost.

After defining a set of potential trajectories from a plurality of possible trajectories that are possible, the trajectory generator can evaluate the set of potential trajectories to select a target trajectory for motion planning. The trajectory generator can access the cost volume generated by the backbone network to generate a set of timestep cost indices for each potential trajectory. For example, the trajectory generator can generate a timestep cost index from each filter of the cost volume corresponding to a particular time step. The trajectory generator can sum the timestep cost index from the different filters to calculate a trajectory score for a potential trajectory. The trajectory generator can select the potential trajectory having the minimum total cost index or trajectory score as the target trajectory for final motion planning by the autonomous vehicle.

Accordingly, an autonomous vehicle in accordance with example embodiments of the disclosed technology may include a vehicle computing system configured to perform motion planning for the autonomous vehicle. The vehicle computing system can include a motion planning system for example. The motion planning system can include a machine-learned motion planning model that is configured to receive sensor data and map data associated with an environment external to the autonomous vehicle. The motion planning model can process the sensor data and the map data to generate a target trajectory for the autonomous vehicle. The motion planning model can include a backbone network that is configured to receive the sensor data and the map data and to generate a cost volume that includes data indicative of a cost associated with each of a plurality of future locations of the autonomous vehicle within a planning horizon.

The backbone network can be configured to generate one or more intermediate representations associated with at least one of an object detection or an object prediction by the backbone network. In some examples, an intermediate representation may include a three-dimensional object detection and/or a motion prediction or forecast associated with the object detection. For example, an intermediate representation can include a bounding box associated with an object detection and/or one or more motion predictions associated with an object prediction. The backbone network can include a perception header that is configured to generate the intermediate representations based at least in part on the sensor data and the map data. The backbone network can include a cost volume header that is configured to generate a cost volume based at least in part on the sensor data and the map data. The perception header can include a first set of one or more convolutional network layers. The cost volume header can include a second set of one or more convolutional network layers. In some examples, the motion planning model can be trained such that the first set of convolutional network layers for object detection are optimized based at least in part on an output of the set of convolutional network layers for generating the cost volume.

In accordance with some embodiments, a motion plan can be generated for an autonomous vehicle by obtaining sensor data and map data associated with an environment external to the autonomous vehicle. A vehicle computing system can generate a cost volume indicative of a cost associated with each of a plurality of future locations of the autonomous vehicle by utilizing a backbone network of machine-learned motion planning model. The vehicle computing system can generate one or more intermediate representations associated with one or more objects detected by the backbone network. The vehicle computing system can obtain a set of potential trajectories for the autonomous vehicle. A trajectory generator of the vehicle computing system can generate a respective cost for each of the set of potential trajectories based at least in part on the cost volume associated with the potential trajectory. The trajectory generator can select the potential trajectory having the minimum trajectory cost as the target trajectory for the autonomous vehicle.

Embodiments in accordance with the disclosed technology provide a number of technical effects and benefits, particularly in the areas of computing technology, autonomous vehicles, and the integration of computing technology with autonomous vehicles. In particular, example implementations of the disclosed technology provide improved techniques for generating motion plans such as target trajectories for autonomous vehicles. For example, by utilizing one or more implementations of the disclosed technology, a vehicle computing system can more accurately and efficiently generate motion plans for an autonomous vehicle and thereby enable the autonomous vehicle to drive autonomously in complex scenarios that may include traffic light handling, yielding, and interactions with multiple actors such as pedestrians and other vehicles.

A holistic machine-learned motion planning model is provided that can take as input raw sensor data and produce a cost volume to define a cost associated with each position that the autonomous vehicle can take within a planning horizon. In addition, the motion planning model can produce interpretable intermediate representations in the form of three-dimensional detections and future trajectories. Such a model provides an end-to-end driving approach that can avoid shortcomings associated with traditional engineering stacks that divide the driving problem into subtasks including perception, prediction, motion planning, and control. For example, the machine-learned motion planning model can be trained to optimize the end task of motion planning based on raw sensor data. More particularly, the machine-learned motion planning model can be trained such that intermediate representations including object detections and motion predictions are optimized for the end task of motion planning rather than for their particular subtasks. Such an approach can provide more accurate motion plans based on more optimal intermediate representation generations. Moreover, a nonparametric cost volume as described is able to capture the uncertainty and multi-modality that is possible with autonomous vehicle trajectories. Such a learned cost volume approach naturally captures multi-modality and uncertainty that is present in autonomous driving.

Additionally, the utilization of a trajectory generator can enable an accurate and efficient generation of potential trajectories from which the target trajectory for the autonomous vehicle can be selected. For instance, a large number of possible trajectories can be possible for an autonomous vehicle, which can lead to a minimization problem whose optimization is non-polynomial hard, and thus may result in an inefficient determination of potential trajectories. To overcome such drawbacks, sampling can be utilized by the trajectory generator to obtain a low-cost trajectory in a timely and computationally efficient manner. Trajectories can be efficiently sampled that are physically possible so that the cost volume can be evaluated efficiently. Recognizing that an autonomous vehicle cannot execute all possible set of points in Cartesian space, sampling a trajectory and a set of points in the available space may not be an optimal approach. Accordingly, the trajectory generator can be configured to consider real-world constraints such as physical limits on speed, acceleration, and turning angle. By employing dynamical models, efficiencies in computing processing requirements and time can be achieved.

Compared with traditional machine-learned model approaches, such as imitation learning approaches that directly regress steer angle from raw sensor data, a machine-learned model in accordance with the disclosed technology may provide interpretability and handle multi-modality naturally. For instance, when compared with traditional approaches which use manually designed cost functions built on top of perception and prediction systems, a motion planning model in accordance with the disclosed technology can provide the advantage of being jointly trained. Thus, learned representations that are more optimal for the end task of motion planning can be provided. Additionally, an interpretable machine-learned motion planning model in accordance with the disclosed technology enables feedback to be backpropagated from the motion planning system as part of optimizing the generation of intermediate representations. Furthermore, the machine-learned motion planning model can handle uncertainty naturally as this is represented in the cost volume, and does not require costly parameter tuning such that concepts can be learned that are difficult to specify by hand. By utilizing a machine-learned motion planning model that handles uncertainty as well as multi-modality, an autonomous vehicle can increase the accuracy and efficiency of motion planning in real time and thereby increase the safety and reliability of autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference now to the figures, example embodiments of the present disclosure will be discussed in further detail.

FIG. 1 illustrates an example vehicle computing system 110 according to example embodiments of the present disclosure. The vehicle computing system 110 can be associated with a vehicle 102. The vehicle computing system 110 can be located onboard (e.g., included on and/or within) the vehicle 102.

The vehicle 102 incorporating the vehicle computing system 110 can be various types of vehicles. In some implementations, the vehicle 102 can be an autonomous vehicle. For instance, the vehicle 102 can be a ground-based autonomous vehicle such as an autonomous car, autonomous truck, autonomous bus, etc. The vehicle 102 can be an air-based autonomous vehicle (e.g., airplane, helicopter, bike, scooter, or other aircraft) or other types of vehicles (e.g., watercraft, etc.). The vehicle 102 can drive, navigate, operate, etc. with minimal and/or no interaction from a human operator 106 (e.g., driver). An operator 106 (also referred to as a vehicle operator) can be included in the vehicle 102 and/or remote from the vehicle 102. Moreover, in some implementations, the vehicle 102 can be a non-autonomous vehicle. The operator 106 can be associated with the vehicle 102 to take manual control of the vehicle, if necessary. For instance, in a testing scenario, a vehicle 102 can be periodically tested with controlled faults that can be injected into an autonomous vehicle's autonomy system 130. This can help the vehicle's response to certain scenarios. A vehicle operator 106 can be located within the vehicle 102 and/or remote from the vehicle 102 to take control of the vehicle 102 (e.g., in the event the fault results in the vehicle exiting from a fully autonomous mode in the testing environment).

The vehicle 102 can be configured to operate in a plurality of operating modes. For example, the vehicle 102 can be configured to operate in a fully autonomous (e.g., self-driving) operating mode in which the vehicle 102 is controllable without user input (e.g., can drive and navigate with no input from a vehicle operator present in the vehicle 102 and/or remote from the vehicle 102). The vehicle 102 can operate in a semi-autonomous operating mode in which the vehicle 105 can operate with some input from a vehicle operator present in the vehicle 102 (and/or a human operator that is remote from the vehicle 102). The vehicle 102 can enter into a manual operating mode in which the vehicle 102 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 102 can implement vehicle operating assistance technology (e.g., collision mitigation system, power assist steering, etc.) while in the manual operating mode to help assist the vehicle operator 106 of the vehicle 102. For example, a collision mitigation system can utilize information concerning vehicle trajectories within the vehicle's surrounding environment to help an operator avoid collisions even when in manual mode.

The operating modes of the vehicle 102 can be stored in a memory onboard the vehicle 102. For example, the operating modes can be defined by an operating mode data structure (e.g., rule, list, table, etc.) that indicates one or more operating parameters for the vehicle 102, while in the particular operating mode. For example, an operating mode data structure can indicate that the vehicle 102 is to autonomously plan its motion when in the fully autonomous operating mode. The vehicle computing system 110 can access the memory when implementing an operating mode.

The operating mode of the vehicle 102 can be adjusted in a variety of manners. For example, the operating mode of the vehicle 102 can be selected remotely, off-board the vehicle 105. For example, a remote computing system (e.g., of a vehicle provider and/or service entity associated with the vehicle 102) can communicate data to the vehicle 102 instructing the vehicle 102 to enter into, exit from, maintain, etc. an operating mode. For example, in some implementations, the remote computing system can be an operations computing system 180, as disclosed herein. By way of example, such data communicated to a vehicle 102 by the operations computing system 180 can instruct the vehicle 102 to enter into the fully autonomous operating mode. In some implementations, the operating mode of the vehicle 102 can be set onboard and/or near the vehicle 102. For example, the vehicle computing system 100 can automatically determine when and where the vehicle 102 is to enter, change, maintain, etc. a particular operating mode (e.g., without user input). Additionally, or alternatively, the operating mode of the vehicle 102 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 102). In some implementations, the operating mode of the vehicle 102 can be adjusted by manipulating a series of interfaces in a particular order to cause the vehicle 102 to enter into a particular operating mode.

The vehicle computing system 110 can include one or more computing devices located onboard the vehicle 102. For example, the computing device(s) can be located on and/or within the vehicle 102. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 102 (e.g., its computing system, one or more processors, etc.) to perform operations and functions, such as those described herein for identifying travel way features.

The vehicle 102 can include a communications system 112 configured to allow the vehicle computing system 110 (and its computing device(s)) to communicate with other computing devices. The vehicle computing system 110 can use the communications system 112 to communicate with one or more computing device(s) that are remote from the vehicle 102 over one or more networks (e.g., via one or more wireless signal connections). For example, the communications system 112 can allow the vehicle computing system 110 to communicate with an operations computing system 180. By way of example, the operations computing system 180 can include one or more remote servers communicatively linked to the vehicle computing system 110. In some implementations, the communications system 112 can allow communication among one or more of the system(s) onboard the vehicle 102. The communications system 112 can include any suitable components for interfacing with one or more network(s), including, for example, transmitters, receivers, ports, controllers, antennas, and/or other suitable components that can help facilitate communication.

As shown in FIG. 1, the vehicle 102 can include one or more vehicle sensor(s) 116, an autonomy computing system 130, one or more vehicle control systems 120, one or more positioning systems 114, and other systems, as described herein. One or more of these systems can be configured to communicate with one another via a communication channel. The communication channel can include one or more data buses (e.g., controller area network (CAN)), onboard diagnostics connector (e.g., OBD-II), and/or a combination of wired and/or wireless communication links. The onboard systems can send and/or receive data, messages, signals, etc. amongst one another via the communication channel.

The vehicle sensor(s) 116 can be configured to acquire sensor data 118. This can include sensor data associated with the surrounding environment of the vehicle 102. For instance, the sensor data 118 can include two-dimensional data depicting the surrounding environment of the vehicle 102. In addition, or alternatively, the sensor data 118 can include three-dimensional data associated with the surrounding environment of the vehicle 102. For example, the sensor(s) 116 can be configured to acquire image(s) and/or other two- or three-dimensional data within a field of view of one or more of the vehicle sensor(s) 116. The vehicle sensor(s) 116 can include a Light Detection and Ranging (LIDAR) system, a Radio Detection and Ranging (RADAR) system, one or more cameras (e.g., visible spectrum cameras, infrared cameras, etc.), motion sensors, and/or other types of two-dimensional and/or three-dimensional capturing devices. The sensor data 118 can include image data, radar data, LIDAR data, and/or other data acquired by the vehicle sensor(s) 116. For example, the vehicle sensor(s) 116 can include a front-facing RGB camera mounted on top of the vehicle 102 and the sensor data 118 can include an RGB image depicting the surrounding environment of the vehicle 102. In addition, or alternatively, the vehicle sensor(s) 116 can include one or more LIDAR sensor(s) and the sensor data 118 can include one or more sparse sets of LIDAR measurements. Moreover, the vehicle 102 can also include other sensors configured to acquire data associated with the vehicle 102. For example, the vehicle 102 can include inertial measurement unit(s), wheel odometry devices, and/or other sensors. In some implementations, the sensor data 118 and/or map data 132 can be processed to select one or more target trajectories for traversing within the surrounding environment of the vehicle 102.

In addition to the sensor data 118, the autonomy computing system 130 can retrieve or otherwise obtain map data 132. The map data 132 can provide static world representations about the surrounding environment of the vehicle 102. For example, in some implementations, a vehicle 102 can exploit prior knowledge about the static world by building very detailed maps (HD maps) that represent not only the roads, buildings, bridges, and landmarks, but also traffic lanes, signs, and lights to centimeter accurate three-dimensional representations. More particularly, map data 132 can include information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other data that provides information that assists the vehicle 102 in comprehending and perceiving its surrounding environment and its relationship thereto.

The vehicle 102 can include a positioning system 114. The positioning system 114 can determine a current position of the vehicle 102. The positioning system 114 can be any device or circuitry for analyzing the position of the vehicle 102. For example, the positioning system 114 can determine a position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 110 and/or provided to a remote computing system. For example, the map data 132 can provide the vehicle 102 relative positions of the elements of a surrounding environment of the vehicle 102. The vehicle 102 can identify its position within the surrounding environment (e.g., across six axes, etc.) based at least in part on the map data 132. For example, the vehicle computing system 110 can process the sensor data 118 (e.g., LIDAR data, camera data, etc.) to match it to a map of the surrounding environment to get an understanding of the vehicle's position within that environment.

The autonomy computing system 130 can include a perception system 140, a prediction system 150, a motion planning system 160, and/or other systems that cooperate to perceive the surrounding environment of the vehicle 102 and determine a motion plan for controlling the motion of the vehicle 102 accordingly.

For example, the autonomy computing system 130 can obtain the sensor data 118 from the vehicle sensor(s) 116, process the sensor data 118 (and/or other data) to perceive its surrounding environment, predict the motion of objects within the surrounding environment, and generate an appropriate motion plan through such surrounding environment. The autonomy computing system 130 can communicate with the one or more vehicle control systems 120 to operate the vehicle 102 according to the motion plan.

The vehicle computing system 100 (e.g., the autonomy computing system 130) can identify one or more objects that are proximate to the vehicle 102 based at least in part on the sensor data 118 and/or the map data 132. For example, the vehicle computing system 110 (e.g., the perception system 140) can process the sensor data 118, the map data 132, etc. to obtain perception data 142. The vehicle computing system 110 can generate perception data 142 that is indicative of one or more states (e.g., current and/or past state(s)) of a plurality of objects that are within a surrounding environment of the vehicle 102. For example, the perception data 142 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class); the uncertainties associated therewith, and/or other state information. The perception system 140 can provide the perception data 142 to the prediction system 150, the motion planning system 160, and/or other system(s).

The prediction system 150 can be configured to predict a motion of the object(s) within the surrounding environment of the vehicle 102. For instance, the prediction system 150 can generate prediction data 152 associated with such object(s). The prediction data 152 can be indicative of one or more predicted future locations of each respective object. For example, the prediction system 150 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 152 can be indicative of the speed and/or acceleration at which the respective object is predicted to travel along its associated predicted motion trajectory. The prediction system 150 can output the prediction data 152 (e.g., indicative of one or more of the predicted motion trajectories) to the motion planning system 160.

The vehicle computing system 110 (e.g., the motion planning system 160) can determine a motion plan 162 for the vehicle 102 based at least in part on the perception data 142, the prediction data 152, and/or other data.

A motion plan 162 can include vehicle actions (e.g., planned vehicle trajectories, speed(s), acceleration(s), other actions, etc.) with respect to one or more of the objects within the surrounding environment of the vehicle 102 as well as the objects' predicted movements. For instance, the motion planning system 160 can implement an optimization algorithm, model, etc. that considers cost data associated with a vehicle action as well as other objective functions (e.g., cost functions based on speed limits, traffic lights, etc.), if any, to determine optimized variables that make up the motion plan 162. The motion planning system 160 can determine that the vehicle 102 can perform a certain action (e.g., pass an object, etc.) without increasing the potential risk to the vehicle 102 and/or violating any traffic laws (e.g., speed limits, lane boundaries, signage, etc.). For instance, the motion planning system 160 can evaluate one or more of the predicted motion trajectories of one or more objects during its cost data analysis as it determines an optimized vehicle trajectory through the surrounding environment. The motion planning system 160 can generate cost data associated with such trajectories. In some implementations, one or more of the predicted motion trajectories may not ultimately change the motion of the vehicle 102 (e.g., due to an overriding factor). In some implementations, the motion plan 162 may define the vehicle's motion such that the vehicle 102 avoids the object(s), reduces speed to give more leeway to one or more of the object(s), proceeds cautiously, performs a stopping action, etc.

The motion planning system 160 can be configured to continuously update the vehicle's motion plan 162 and a corresponding planned vehicle motion trajectory. For example, in some implementations, the motion planning system 160 can generate new motion plan(s) for the vehicle 102 (e.g., multiple times per second). Each new motion plan can describe a motion of the vehicle 102 over the next planning period (e.g., next several seconds). Moreover, a new motion plan may include a new planned vehicle motion trajectory. Thus, in some implementations, the motion planning system 160 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 102.

The vehicle computing system 110 can cause the vehicle 102 to initiate a motion control in accordance with at least a portion of the motion plan 162. A motion control can be an operation, action, etc. that is associated with controlling the motion of the vehicle. For instance, the motion plan 162 can be provided to the vehicle control system(s) 120 of the vehicle 102. The vehicle control system(s) 120 can be associated with a vehicle controller (e.g., including a vehicle interface) that is configured to implement the motion plan 162. The vehicle controller can, for example, translate the motion plan into instructions for the appropriate vehicle control component (e.g., acceleration control, brake control, steering control, etc.). By way of example, the vehicle controller can translate a determined motion plan 162 into instructions to adjust the steering of the vehicle 102 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 162 (e.g., by sending control signal(s), making the translated plan available, etc.). This can allow the vehicle 102 to autonomously travel within the vehicle's surrounding environment.

As shown in FIG. 1, the vehicle computing system 110 can include a motion planner 164 that is configured to generate motion plans 162 and/or assist in generating motion plans 162. Motion planner 164 can be configured to generate a target trajectory for the autonomous vehicle in example embodiments. Motion planner 164 can receive sensor data and map data associated with the environment external to the autonomous vehicle, and process the sensor data and map data to generate a target trajectory for the autonomous vehicle. In some examples, such as that depicted in FIG. 1, motion planner 164 can be configured as a separate system from perception system 140, prediction system 150, and/or motion planning system 160. Motion planner 164 may receive sensor data 118 and map data 132 and generate one or more target trajectories that are provided to motion planning system 160 in order to generate motion plans 162. In another example, motion planner 164 can be integrated within motion planning system 160. In some instances, motion planner 164 may be configured to perform perception and prediction tasks such that a separate perception system 140 and prediction system 150 can be omitted. For example, motion planner 164 can include a motion planning model configured to perform the functions of perception system 140, prediction system 150, and motion planning system 160. In some examples, motion planner 164 can include a perception system 140 and/or prediction system 150. In some examples, motion planner 164 can generate intermediate representations such as perception data 142 and prediction data 152, as well as one or more target trajectories for the autonomous vehicle 102. Vehicle computing system 110 of FIG. 1 can be configured to receive output(s) from motion planner 164. For example, output(s) can be provided from the motion planner 164 to motion planning system 160 and/or vehicle control system 120.

In some examples, motion planner 164 can include an end-to-end learnable and interpretable motion planning model. The machine-learned motion planning model can be configured to receive map data and sensor data such as raw image data, light-detection and ranging (LIDAR) data, RADAR data, etc. and to directly generate a motion plan 162 for an autonomous vehicle based on the raw sensor data. The motion planner in some examples may include a single neural network that takes raw sensor data and dynamic map data as an input, and predicts a cost map for motion planning as an output. A single machine-learned motion planning model may be configured in an end-to-end fashion to receive raw sensor data and generate one or more motion plans 162 for the autonomous vehicle. The motion planner may be configured to generate a target trajectory of a motion plan for an autonomous vehicle, as well as one or more intermediate representations of the environment external to the autonomous vehicle based on the sensor data. In this manner, a motion planning model may be trained end-to-end to provide motion planning for an autonomous vehicle based on raw sensor data, while also providing intermediate representations such as perception data 142 and prediction data 152 as an interpretable output. Accordingly, the motion planner may provide an end-to-end driving approach that is optimized for the motion planning task, while also providing intermediate representations that can be accessed to improve the effectiveness of the model, such as by training to optimize the intermediate representations for motion planning.

Although many examples are described herein with respect to autonomous vehicles, the disclosed technology is not limited to autonomous vehicles. In fact, any object capable of collecting sensor data and map data can utilize the technology described herein for generating a target trajectory. For example, a non-autonomous vehicle may utilize aspects of the present disclosure to generate a target trajectory for an operator of the non-autonomous vehicle, notify the vehicle operator of the target trajectory, and take precautionary measures based on the identified target trajectory. Likewise, a smart phone with one or more cameras, a robot, augmented reality system, and/or another type of system can utilize aspects of the present disclosure to generate target trajectories.

Figure 2:
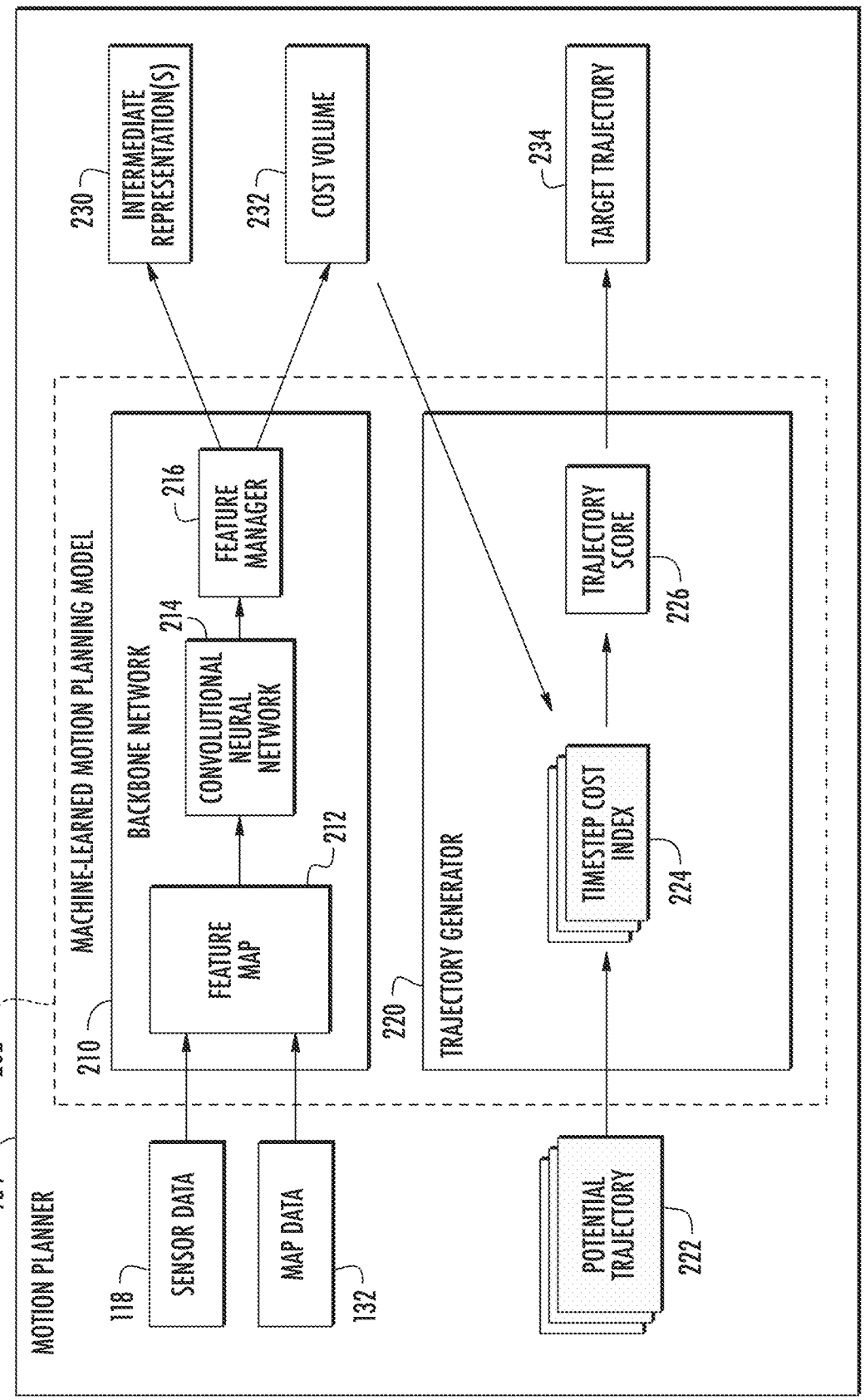
FIG. 2 depicts an example computing environment including a motion planning system of a vehicle computing system for an autonomous vehicle according to example embodiments of the present disclosure.

FIG. 2 depicts a block diagram of an example motion planner 164 in accordance with example embodiments of the present disclosure. Motion planner 164 can be configured to determine a target trajectory of a motion plan for an autonomous vehicle (e.g., vehicle 102) based at least in part on sensor data 118 from sensors 116 and/or map data 132. The motion planner 164 can detect and determine information about the current locations of objects and/or predicted future locations and/or moving paths of proximate objects. The motion planner 164 can determine a motion plan for the autonomous vehicle (e.g., vehicle 102) that best navigates the autonomous vehicle (e.g., vehicle 102) along a determined travel route relative to the objects at such locations. The motion planning system 160 then can provide the selected motion plan to a vehicle control system 138 that controls one or more vehicle controls (e.g., actuators or other devices that control gas flow, steering, braking, etc.) to execute the selected motion plan.

Motion planner 164 includes one or more machine learned motion planning model(s) 202. A motion planning model 202 can be configured to receive sensor data 118 and map data 132, and generate one or more intermediate representations 230 and a cost volume 232 based on the sensor data and map data. Additionally, motion planning model can be configured to obtain one or more potential trajectories 222 (also referred to as trajectory proposals) for the autonomous vehicle. In some examples, motion planning model 202 can generate a set of potential trajectories based on sensor data and/or map data associated with the autonomous vehicle. Motion planning model 202 can select a target trajectory 234 from the plurality of potential trajectories 222 for the autonomous vehicle. In other examples, motion planning model 202 can optimize a randomly or otherwise sampled trajectory to generate a target trajectory.

Motion planning model 202 may include a backbone network 210 and a trajectory generator 220. Backbone network 210 can receive sensor data 118 and map data 132 as input(s) in some examples. Backbone network 210 can provide as output(s) one or more intermediate representations 230 of objects, as well as a cost volume 232 associated with locations in the environment external to the autonomous vehicle. The intermediate representations 230 and cost volume(s) 232 can be based at least in part on the sensor data 118 and map data 132. The sensor data can include LIDAR data in some examples. Additionally or alternatively, RADAR data, image data, and/or other sensor data indicative of an environment external to or otherwise surrounding an autonomous vehicle can be used.

The backbone network 210 can be configured to generate one or more feature map(s) 212 from the sensor data 118 and/or map data 132. For example, feature map 212 may include one or more tensors associated with sensor data 118 and one or more tensors associated with map data 132. Feature map 212 can be provided as an input to one or more convolutional neural networks 214. Convolutional neural networks 214 can generate the one or more intermediate representations 230 and the one or more cost volumes 232. Feature manager 216 can manage the output(s) of the backbone network 210 to provide intermediate representations 230 and the cost volumes 232.

In some implementations, the machine-learned motion planning model may be configured to generate one or more interpretable immediate representations based on the sensor data, such as three-dimensional object detections and/or motion predictions for detected objects. The intermediate representations can include bounding boxes of objects external to the autonomous vehicle for current and/or future timesteps in some examples. The intermediate representations can additionally or alternatively include predictions associated with one or more objects. For example, a predicted position and/or motion can be provided. A predicted motion may include a predicted object path, as well as a velocity and/or acceleration associated with the object. These intermediate representations 230 are provided as an independent output of the backbone network 210 in some examples. In this manner, the intermediate representations 230 are interpretable. For example, the intermediate representations may be accessed by a training computing system during training of the machine-learned motion planning model 202 for generating target trajectories.

The cost volume 232 can define a cost of a plurality of positions or locations that an autonomous vehicle may take within a planning horizon. The cost volume may represent a measure of the desirability of each location or position that the autonomous vehicle may take. For example, the cost or other measure for a particular position may be indicative of a likelihood of safety or other parameter associated with the vehicle taking that position. A lower cost may be indicative of a lower likelihood of collision with another object at a particular location, for example, whereas a higher cost may be indicative of a higher likelihood of collision with another object at the particular location.

The trajectory generator 220 can generate a target trajectory for the autonomous vehicle based at least in part on the cost volume. For instance, the trajectory generator can optimize a sampled trajectory using the cost volume to generate a target trajectory. The trajectory generator can include an optimizer that optimizes a sampled trajectory by minimizing the cost computed for the trajectory using the cost volume. In another examples, the trajectory generator can sample a set of diverse physically possible trajectories for the autonomous vehicle and compute a score for a set of potential trajectories 222 based on the cost volume. The model can select a target trajectory 234 for the autonomous vehicle based on the trajectory score(s) 226 for a set of potential trajectories 222. For example, the model can select the potential trajectory having the lowest trajectory score (also referred to as minimum cost) as the target trajectory for the autonomous vehicle. Trajectory generator 220 can receive or access cost volume 232 to compute trajectory score 226 for each potential trajectory 222. Trajectory generator 220 can generate a plurality of timestamp cost indices 224 for each potential trajectory 222. For example, each time step cost index can represent a cost from different filters of the cost volume 232. Trajectory generator 220 can sum together the plurality of timestep cost indices for a potential trajectory 222 in order to compute trajectory score 226.

In this manner, the machine-learned motion planning model is able to utilize a nonparametric cost volume that can capture the uncertainty and multimodality in possible AV trajectories, such as the uncertainty and multimodality in changing a lane versus staying in a lane. By utilizing a motion planner that includes an end-to-end machine-learned motion planning model, the motion planning system is capable of handling complex urban scenarios that include traffic light handling, yielding, and interactions with multiple road users.

Figure 3:
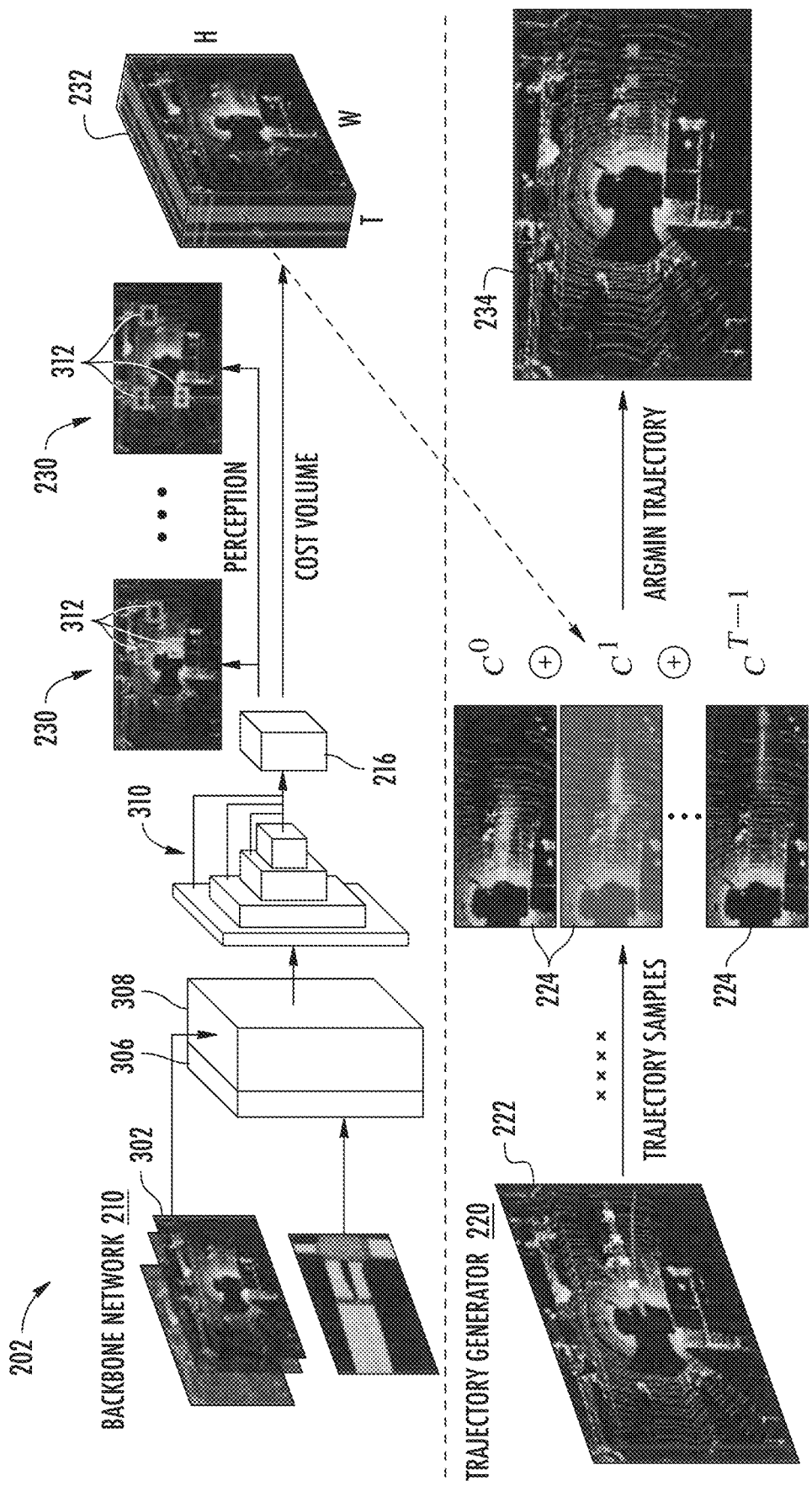
FIG. 3 depicts an example computing environment including a machine-learned motion planning model of a motion planning system for an autonomous vehicle according to example embodiments of the present disclosure.

FIG. 3 depicts additional details of a machine learned motion planning model 202 including a backbone network 210 and a trajectory generator 220 in accordance with example embodiments of the disclosed technology. In the example depicted in FIG. 3, the machine learned motion planning model 22 can be configured as an interpretable and end-to-end motion planner. Motion planning model 202 can take as input raw sensor data and map data, and generate as independent outputs of the model one or more intermediate representations 230, one or more cost volumes 232, and one or more target trajectories 234 directly from the raw sensor data and map data.

Backbone network 210 can take as input LIDAR data 302 and high definition map data 304. Backbone network 210 can generate a feature map 212 including one or more map features 306 and one or more LIDAR features 308. In some examples, the one or more map features 306 may each include an M-channel tensor generated from high definition map data that contains information about the semantics of the environment external to the autonomous vehicle. For example, semantic data such as the location of lane, lane boundaries shape (e.g., solid, dashed) and the location of signs such as stop signs and the like may be included in map data. The one or more LIDAR features 308 may each include a three-dimensional tensor based on a plurality of observational sweeps by one or more LIDAR sensors. The LIDAR space can be rasterized into a 3D occupancy grid, where each voxel has a binary value indicating whether it contains a LIDAR point, thereby resulting in the three-dimensional tensor.

The one or more map features 306 and the one or more LIDAR features 308 can be provided as a feature map to a convolutional neural network 214. Convolutional neural network 214 may include a plurality convolutional layers 310. The plurality of convolutional layers 310 may include one or more convolution layers and one or more deconvolution layers. Convolution layers 310 may generate one or more intermediate representations 230 and one or more cost volumes 232 which are provided as an output of the backbone network by feature manager 216.

The one or more intermediate representations 230 may include bounding boxes 312 representing an object such as other actors in the environment external to the autonomous vehicle. The bounding boxes may represent an object for future timesteps, such as to represent a perception output of the machine learned motion planning model 202. The motion planning model can generate one or more interpretable intermediate representations 230 in the form of three-dimensional object detections and/or future motion forecasts over the planning horizon for the three-dimensional object detections. In some examples, the interpretable intermediate representations are provided as a first output of the motion planning model.

The motion planning model can additionally generate a space-time cost volume 232 that represents a cost associated with all locations that the autonomous vehicle can take within the planning horizon. The space-time cost volume can be generated as a second output of the motion planning model in some examples. Convolution layers 310 can generate cost volume 232 in some examples. Cost volume 232 can be a space-time cost volume having a dimension of H×W×T, where H represents the height, W represents a width, and T represents a filter number for planning over a horizon with a number of timesteps equal to the filter number.

One or more potential trajectories can be scored and/or optimized using the learned cost volume. In some examples, the trajectory generator can optimize a sampled trajectory using the cost volume. For example, the trajectory generator can include an optimizer that optimizes a sampled trajectory by minimizing the cost computed for the trajectory using the cost volume. In another examples, a series of potential trajectories 222 or trajectory proposals can be scored using the learned cost volume 232. The motion planning model 202 can select a target trajectory 234 based on the score for each potential trajectory. For example, the motion planning model can select the target trajectory having the lowest trajectory score or the minimum cost. The target trajectory, representing the potential trajectory having the minimum cost, can be provided as a third output of the motion planning model 202 in some examples. For a potential trajectory, trajectory generator 220 generates a timestamp cost index based at least in part on cost volume 232. For each potential trajectory, its cost is indexed from the different filters of the cost volume and summed together to generate a trajectory score 226 for each potential trajectory 222. For instance, a number of timestamp cost indices 224 will be generated that is equal to the filter number T in some examples. As illustrated in FIG. 3, trajectory generator 220 generates a timestep cost index $C^0$ through $c^{T-1}$ or each filter of the cost volume 232. In some examples, each timestep cost index corresponds to one timestep of cost volume 232 over a potential trajectory.

According to some examples, machine learned motion planning model 202 can be configured as a deep structured interpretable neural motion planner configured for deep structured planning. More formally, consider that $s = \{s^0, s^1, \ldots, s^{T-1}\}$ can be a trajectory spanning over T timesteps into the future. A location in bird's eye view (BEV) at time step t can be represented by s. The planning problem can then be formulated as a deep structured minimization problem as set forth in Equation 1:

$$s^* = \underset{s}{\operatorname{argmin}} \sum_t c^t(s^t) \qquad \text{Equation 1}$$

In Equation 1, $c^t$ can represent a learned cost volume indexed at timestep T. The cost volume can be a two-dimensional tensor with the same size as a region of interest. This minimization can be approximated by sampling a set of physically valid trajectories s, and picking the one with minimum cost. In some examples, machine learned motion planning model 202 can employ a convolutional network backbone to compute the cost volume. It can first extract features from both LIDAR data and map data, and then feed the feature map into two branches of convolution layers that output three-dimensional detection and motion forecasting, as well as a planning cost volume, respectively.

Figure 4:
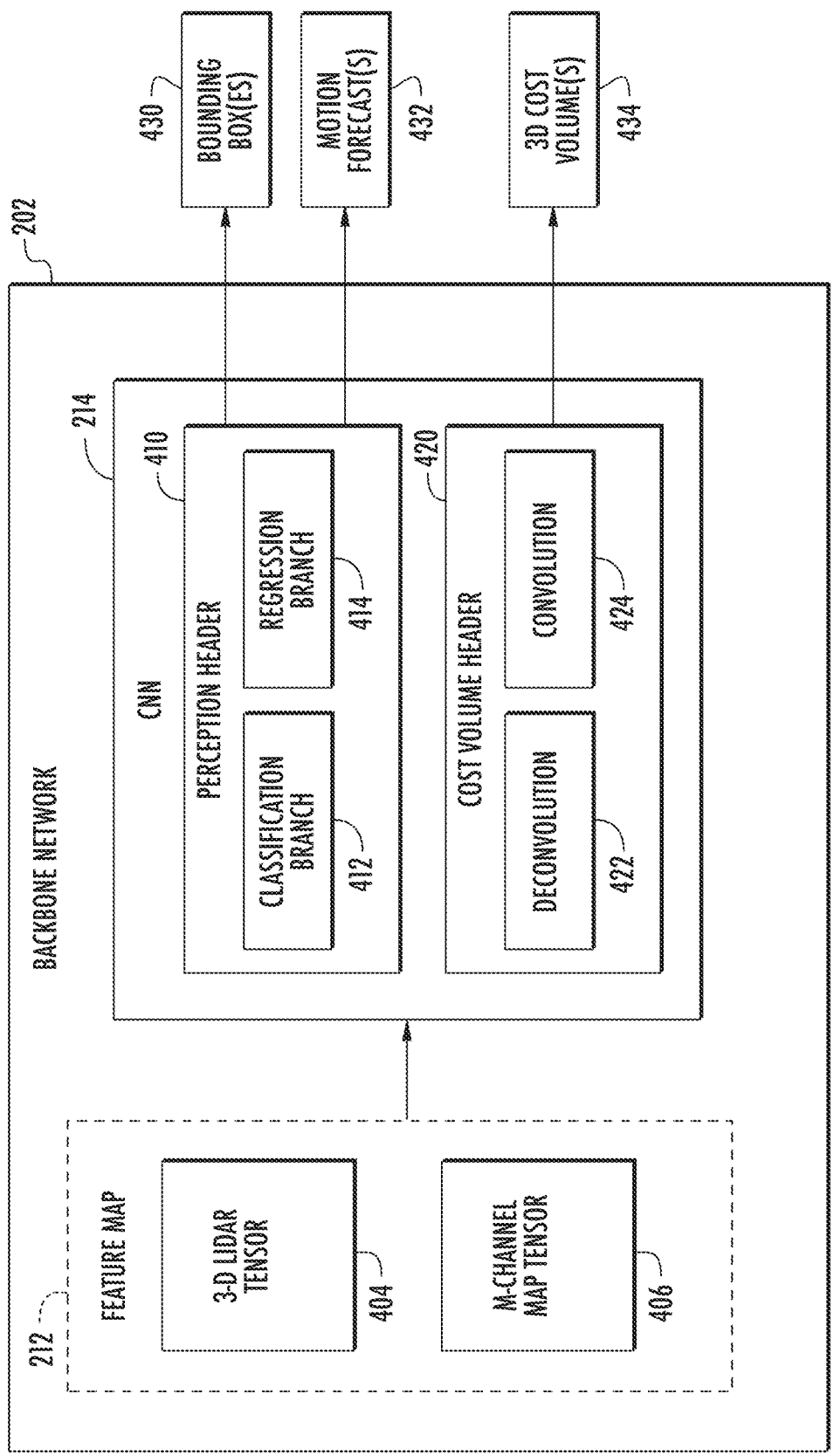
FIG. 4 depicts an example computing environment including a multi-headed convolutional neural network for a machine-learned motion planning model according to example embodiments of the present disclosure.

FIG. 4 depicts a block diagram illustrating additional details of a backbone network 210 in accordance with example embodiments of the present disclosure. Backbone network 210 includes one or more convolutional neural networks 214 configured to generate intermediate representations and a cost volume based on autonomous sensor data received from one or more sensors of an autonomous vehicle. A feature map 212 is provided as an input to the convolutional neural network 214. In this example, feature map 212 includes a three-dimensional LIDAR tensor 404 and an M-channel map tensor 406.

The three-dimensional LIDAR tensor 404 can be generated based at least in part on LIDAR data received from one or more LIDAR sensors of the autonomous vehicle. Backbone network 210 can receive LIDAR point clouds as inputs, such as can be captured by one or more LIDAR sensors mounted on the autonomous vehicle. A number T (e.g., 10) of consecutive sweeps by the LIDAR sensor can be used as observations, in order to infer the motion of external actors or objects. For the LIDAR sweeps, the backbone network can correct for motion of the autonomous vehicle, and can bring the LIDAR point clouds from a past number of frames (e.g., 10 frames) to the same coordinate system centered at the autonomous vehicle's current location. To make the input data amenable to standard convolutions, the LIDAR space can be rasterized into a 3D occupancy grid, where each voxel includes a binary value indicating whether it contains a LIDAR point. This can result in a three-dimensional tensor of a size H×W×(ZT'), where Z, H, W represents the height and x-y spatial dimensions, respectively. In some examples, timesteps along the Z-dimension can be concatenated, thus avoiding three-dimensional convolutions which are memory and computationally intensive. In other examples, however, concatenation may be omitted.

The M-channel map tensor 406 can be generated based at least in part on high-definition map data received by the backbone network 210. Access to a map can enable accurate motion planning, such as by permitting the autonomous vehicle to drive according to traffic rules (e.g., stop at a red light, follow the lane, change lanes only when allowed). Towards this goal, the backbone network can exploit high-definition maps that contain information about the semantics of the scene, such as lane location, the boundary type (e.g., solid, dashed) and the location of stop signs or other signs. In some examples, the map can be rasterized to form an M-channel map tensor, where each channel represents a different map element. For example, map elements can include roads, intersections, lanes, lane boundaries, traffic lights, etc. The resulting feature map 212 including three-dimensional LIDAR tensor 404 and M-channel map tensor 406 can be provided as an input to the convolutional neural network 214. The resulting feature map 212 can have a size H×W×(ZT'+M).

In some examples, backbone network 210 can include a plurality of blocks (e.g., five blocks), were each block has a number of two-dimensional convolutional layers (e.g., {2, 2, 3, 6, 5}) with a filter number (e.g., {32, 64, 128, 256, 256}), a filter size (e.g., 3×3), and a stride (e.g., 1). A number of max-pool layers can be provided after each of a number of the blocks (e.g., after each of the first 3 blocks). A multiscale feature map can be generated after the first 4 blocks. For example, the feature maps from each of the first 4 blocks can be resized to a percentage (e.g. one quarter size) of the input size, and can be concatenated together in order to increase the effective receptive field. The multiscale features can then be fed into the final block. In some examples, the backbone network can have a downsampling rate such as of about 4. Other block architectures can be used.

Convolutional neural network 214 can include a perception header 410 (also referred to as a perception model head) and a cost volume header 420 (also referred to as a cost volume model head) in example embodiments. Perception header 410 can include two components formed of convolution layers, one for classification and one for regression. For example, the perception header 410 may include a classification branch 412 that includes one or more classification layers and a regression branch 414 that includes one or more regression layers. The classification branch 412 may generate intermediate representations such as bounding boxes 430 indicating the probability of an object at an anchor location. To reduce the variance of regression targets, multiple predefined anchor boxes $a_{i,j}^k$ can be employed at each feature map location, where subscript i, j denotes the location on the feature map and k indexes over the anchors. By way of example, there can be 12 anchors at each location, with different sizes aspect ratios, and orientation. The classification branch can output a score $p_{i,j}^k$ for each anchor indicating the probability of a vehicle at each anchor's location. Regression branch 414 may generate intermediate representations such as motion forecasts 432 for an object over a number of timesteps. Regression branch 414 can also output regression targets for each anchor $a_{i,j}^k$ at different time steps. This can include localization offset $l_x^t$, $l_y^t$, size $s_w^t$, $s_h^t$, and heading angle $a_{sin}^t$, $a_{cos}^t$.

The superscript T stands for timeframe, ranging from 0 (present) to T×1 into the future. Regression can be performed every time step, thus producing motion forecasting for each vehicle.

Cost volume header 420 can include one or more deconvolution layers 422 and one or more convolution layers 424 in accordance with example embodiments. To produce a cost volume c at the same resolution as a bird eye view input, two deconvolution layers can be applied on the backbone output with a filter number (e.g., {128, 64}), filter size (e.g., 3×3), and stride (e.g., 1). A final convolution layer can be applied with a filter number T, which corresponds to planning horizon. Each filter can generate a cost volume $c^t$ for a future time step t. This allows the machine-learned motion planning model 202 to evaluate the cost of any trajectory s by simply indexing in the cost volume c. In some examples, the cost volume value can be clipped (e.g., between −1000 to +1000) after the network. Applying such bounds can prevent the cost value from shifting arbitrarily, and can make tuning hyperparameters easier.

Cost volume header 420 can compute a corresponding three-dimensional (3D) cost volume 434 given input LIDAR sweeps and an HD map, by feedforward convolutional operations as described above. Referring again to FIG. 3, trajectory generator 220 can compute a final target trajectory 234 by minimizing Equation 1 in some examples. Such an optimization may be considered non-polynomial hard. Accordingly, sampling can be employed by trajectory generator 220 to obtain a low-cost trajectory. A wide variety of diverse trajectories that can be executed by the autonomous vehicle can be sampled by trajectory generator 220, and a final output can be provided that includes the trajectory with the minimum cost according to the learned cost volume 434. Potential trajectories can be efficiently sampled that are physically possible and the cost volume can be evaluated efficiently in some embodiments.

Figure 5:
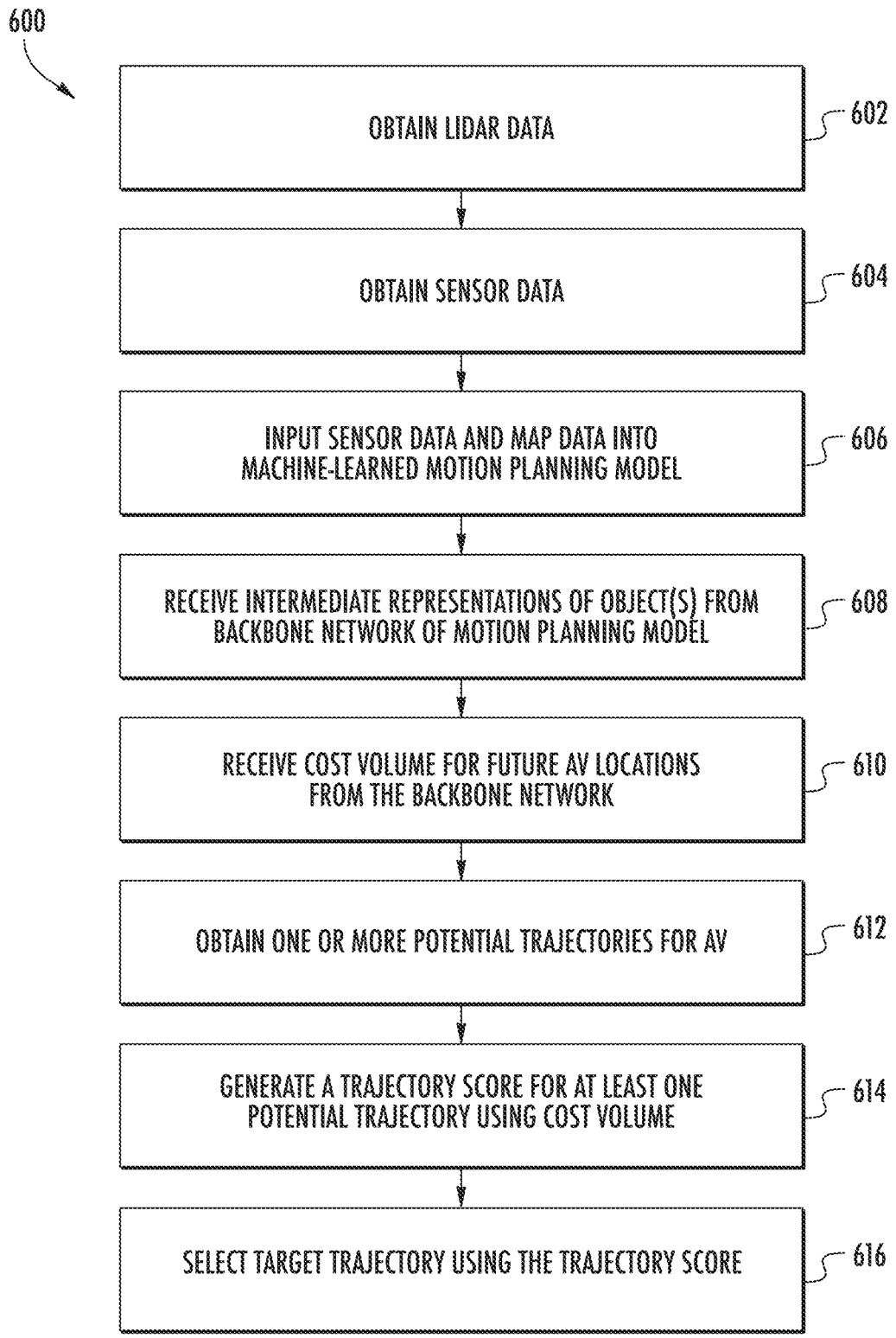
FIG. 5 depicts a flowchart diagram illustrating an example method for generating a target trajectory using a machine-learned motion planning model according to example embodiments of the present disclosure.

FIG. 5 depicts a flowchart diagram illustrating an example method for generating a target trajectory using a machine-learned motion planning model according to example embodiments of the present disclosure. One or more portions of method 600 (and the other methods described herein such as method 630 of FIG. 6 and/or method 650 of FIG. 8) can be implemented by one or more computing devices such as, for example, one or more computing devices of vehicle computing system 100 of FIG. 1, operations computing system 200 of FIG. 2, or computing system 1000 of FIG. 10. One or more portions of method 600 can be implemented as an algorithm on the hardware components of the devices described herein (e.g., as in FIGS. 1, 2, 3, 4 and 10) to, for example, generate a target trajectory for an autonomous vehicle. In example embodiments, method 600 may be performed by a motion planner 164 and/or motion planning system 160 implemented using one or more computing devices of a vehicle computing system (e.g., 200).

At (602), sensor data such as LIDAR data, RADAR data, image data, etc. can be obtained from one or more autonomous vehicle sensors onboard an autonomous vehicle. At (604), map data such as high-definition map data including semantic information about an environment external to the autonomous vehicle can be obtained. The LIDAR data and the map data can be obtained by vehicle computing system 110 in example embodiments.

At (606), the vehicle computing system 110 can input the sensor data and the map data into one or more machine learned motion planning models (e.g., motion planning model 202) in accordance with example embodiments of the present disclosure.

At (608), the vehicle computing system 110 can receive one or more intermediate representations of objects in the environment external to the autonomous vehicle. The one or more intermediate representations can be generated by the backbone network of the motion planning model in example embodiments. At (610), the vehicle computing system 110 can generate one or more cost volumes that are indicative of a cost associated with each of a plurality of future locations of the autonomous vehicle within a planning horizon. The cost volume(s) can be generated by the backbone network of the motion planning model in example embodiments. In some implementations, the backbone network can generate a feature map based on the sensor data and the map data and provide the feature map as input to one or more convolutional neural networks configured to generate the intermediate representations and the cost volume(s).

At (612), one or more potential trajectories for the autonomous vehicle can be obtained. In some examples, the trajectory generator can sample a plurality of possible locations in Cartesian space to generate a set of potential trajectories. The set of potential trajectories may represent less than all possible trajectories for the autonomous vehicle in order to provide a more efficient trajectory generation process. Various constraints such as a speed constraint, an acceleration constraint, and/or a turning angle constraint can be used in order to generate the set of sampled trajectories. In some examples, a trajectory generator can apply a dynamical model to generate the set of potential trajectories according to at least one of the speed constraint, the acceleration constraint, or the turning angle constraint. In some examples, a single potential trajectory can be obtained, such as by random sampling.

At (614), trajectory scores are generated for at least one potential trajectory using the cost volume received at (610). At (616), a target trajectory can be selected based at least in part on the trajectory score(s) generated at (614). In some examples, the trajectory generator 220 can select the potential trajectory having the minimum cost as the target trajectory at (616). In other examples, the model can select the target trajectory by optimizing a potential trajectory, such as a randomly sampled trajectory, based on the cost volume generated by the backbone network.

Figure 6:
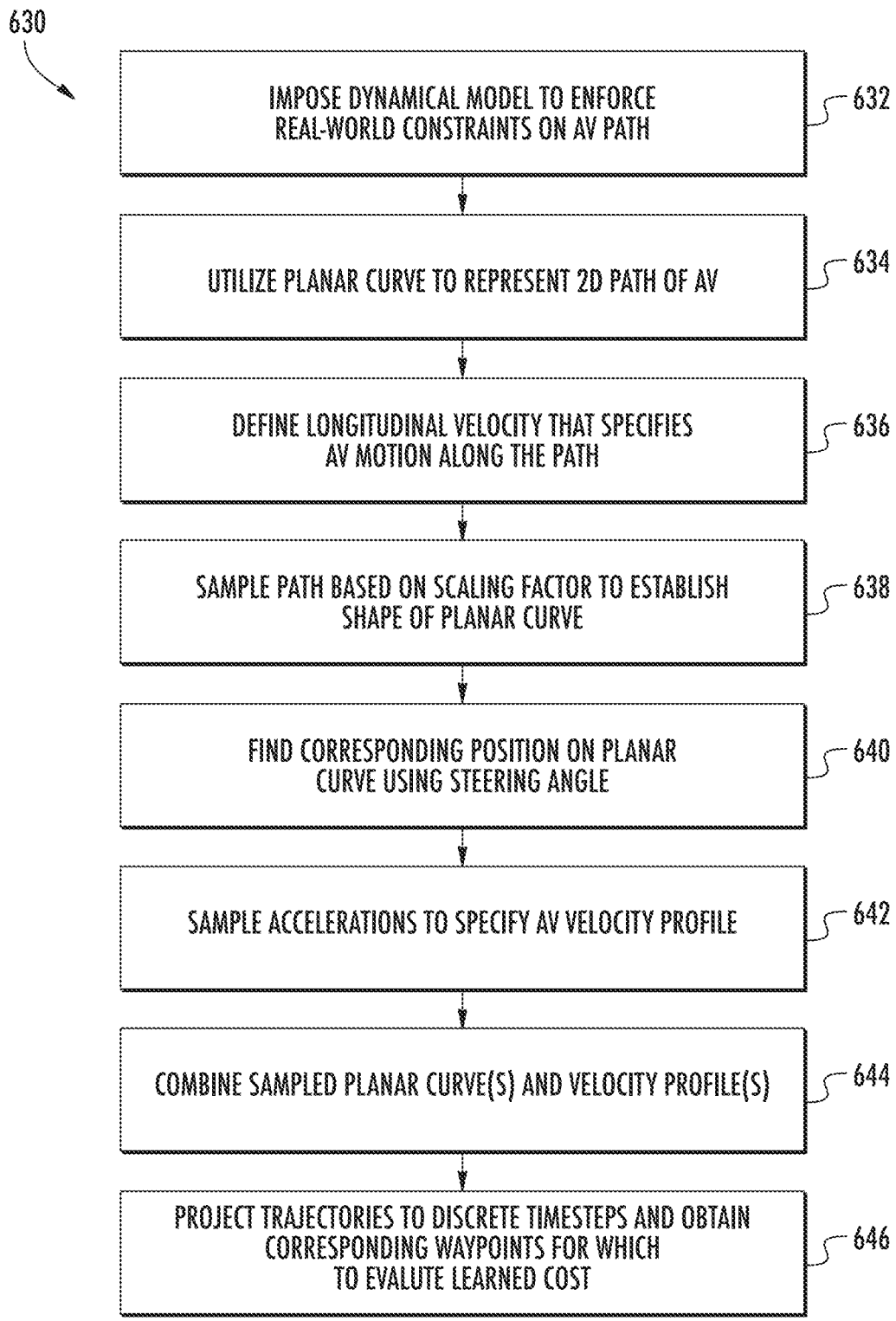
FIG. 6 depicts a flowchart diagram illustrating an example method for obtaining a set of potential trajectories for evaluation using a learned cost volume according to example embodiments of the present disclosure.

FIG. 6 depicts a flowchart diagram illustrating an example method 630 of generating a set of potential trajectories using a machine-learned motion planning model according to example embodiments of the present disclosure. One or more portions of method 630 can be implemented as an algorithm on the hardware components of the devices described herein (e.g., as in FIGS. 1, 2, 3, 4 and 10) to, for example, generate a set of potential trajectories for an autonomous vehicle. In example embodiments, method 630 may be performed by motion planning system 160 implemented using one or more computing devices of a vehicle computing system (e.g., 110).

At (632), the motion planning system imposes a dynamical model to enforce one or more real-world constraints on the autonomous vehicle path. Sampling a trajectory as a set of points in Cartesian space $(x,y) \in \mathbb{R}^2$ may be an inefficient solution. For example, a vehicle may be incapable of executing all possible sets of points in Cartesian space. This can be due to the physical limits of the vehicle, such as speed, acceleration, and turning angle. To consider these real-world constraints, trajectory generator 220 can impose that the vehicle should follow the dynamical model in example embodiments. The dynamical model can represent physical limits such as speed, acceleration, and turning angle. A dynamical model such as a bicycle model or other model of a moving object can be used in planning for autonomous vehicles. A potential trajectory 222 can be defined by the combination of a spatial path (a curve in the 2D plane) and the velocity profile (how fast the vehicle is going along this path). The model can apply the curvature K of the vehicle's path as approximately proportional to the steering angle φ (angle between the front will and the vehicle):

$$\kappa = \frac{2\tan(\phi)}{L} \approx \frac{2\phi}{L},$$

where L is the distance between the front and rear axles of the autonomous vehicle.

Figure 7:
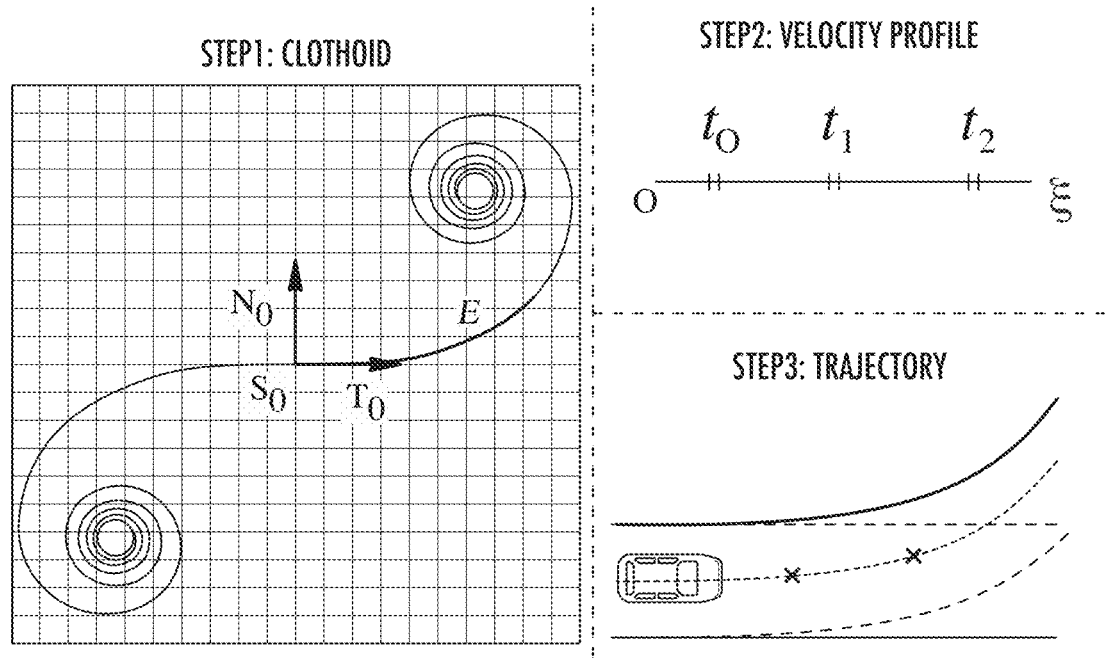
FIG. 7 depicts a graphical representation of generating a potential trajectory for an autonomous vehicle according to example embodiments of the present disclosure.

At (634), a planar curve is used to represent the 2D path of the autonomous vehicle. In some examples the planar curve is a Clothoid curve, also known as an Euler spiral or Cornu spiral. A planar curve such as the Clothoid curve can be used to represent the 2D path of the autonomous vehicle. FIG. 7 depicts one example of a trajectory representation in accordance with example embodiments. A series of steps for defining a trajectory based on a Clothoid curve is depicted.

The curvature K of a point on the curve can be proportional to the point's distance along the curve from the reference point (i.e., KE equals). Considering a model such as the bicycle model, the linear curvature characteristic corresponds to steering the front wheel angle with constant angular velocity. The canonical form of a Cloithoid curve can be defined as set forth in Equations 2, 3, and 4.

$$s(\xi) = s_0 + a\left[C\left(\frac{\xi}{a}\right)T_0 + S\left(\frac{\xi}{a}\right)N_0\right] \quad \text{Equation 2}$$

$$S(\xi) = \int_0^\xi \sin\left(\frac{\pi u^2}{2}\right)du \quad \text{Equation 3}$$

$$C(\xi) = \int_0^\xi \cos\left(\frac{\pi u^2}{2}\right)du \quad \text{Equation 4}$$

In the above equations, $s(\xi)$ defines a Cloithoid curve on a 2D plane, indexed by the distance $\xi$ to reference point $s_0$. The notation $a$ is a scaling factor, and $T_0$ and $N_0$ are the tangent and normal vector of this curve at point $s_0$. $S(\xi)$ and $C(\xi)$ may be referred to as the Fresnel integral, and can be efficiently computed.

At (636), a longitudinal velocity is defined that specifies the autonomous vehicle motion along the path. In order to fully define a trajectory, a longitudinal velocity (e.g., velocity profile) can be defined. The longitudinal velocity can specify the autonomous vehicle motion along the path $s(\xi)$: $\dot{\xi}(t)=\ddot{\xi}(t)+\dot{\xi}_0$, where $\dot{\xi}_0$ is the initial velocity of the autonomous vehicle and h is a constant forward acceleration. By combining these velocities and accelerations, a trajectory points s can be obtained as set forth in equation 1.

At (638), a path is sampled based on a scaling factor to establish the shape of the planar curve. Where a Cloithoid curve is used, sampling the path can correspond to sampling the scaling factor a as set forth in Equation 2. By way of example, if a driving speed limit (e.g., 15 m/s) is considered, the scaling factor a can be sampled in a range (e.g. 6 to 80 m). Once the scaling factor a is sampled, the shape of the Cloithoid curve can be fixed.

At (640) the motion planning system can find a corresponding position on the planar curve using the steering angle of the autonomous vehicle. In some examples, the initial steering angle (e.g., curvature) of the autonomous vehicle can be used to find the corresponding position on the curve. It is noted that Cloithoid curves may not handle circle and straight-line trajectories well. Accordingly, sampling can be used separately in some embodiments. For instance, the probability of using straight-line, circle, and Cloithoid curves can be 0.5, 0.25, and 0.25, respectively, in some examples. In some cases, a single Cloithoid segment can be used to specify the path of an autonomous vehicle. This may be sufficient for a short planning horizon.

At (642), accelerations can be sampled to specify an autonomous vehicle velocity profile. In some examples, constant accelerations can be sampled as a range which specifies the autonomous vehicle's velocity profile. For instance, constant accelerations can be sampled, ranging from −5 m/s2 to 5 m/s2, which specify the autonomous vehicle's velocity profile.

At (644), the sampled planar curves and the velocity profiles can be combined. At (646), the trajectories can be projected to discrete time steps and the corresponding waypoints for which to evaluate the learned cost volume can be obtained. The waypoints can then be used to generate a potential trajectory. A trajectory score for the potential trajectory can be determined by evaluating the cost volume for the waypoints.

A machine learned motion planning model in example embodiments can be trained end-to-end with a multi task objective. The ultimate goal or task may be to plan a safe trajectory while following the rules of traffic. The model can be trained to understand where obstacles are and where they will be in the future order to avoid collisions. Multitask training can be used, with supervision from detection, motion forecasting, as well as human driven trajectories for the autonomous vehicle. In some examples, supervision for the cost volume may not be available. Accordingly, a max-margin loss can be adopted to push the network to learn to discriminate between "good" and "bad" trajectories. An overall loss function can be defined as set forth in equation 5.

$$\mathcal{L}=\mathcal{L}_{perception}+\beta\mathcal{L}_{planning} \quad (5)$$

The multitask loss set forth by the function in Equation 5 not only directs the network to extract useful features, but also to make the network output interpretable results. This may be beneficial for autonomous vehicles as it can facilitate an understanding of the failure cases to thereby improve the system. For instance, the intermediate representations can be accessed as an output of the model to understand how the system is generating classifications and predictions, for example.

The overall loss function can include a perception loss component and a planning loss component. The planning loss component can represent a planning loss. The planning loss can encourage the minimum cost plan to be similar to the trajectory performed by a human demonstrator in some examples. The planning loss can be sparse in some examples as a ground truth trajectory may only occupy a small portion of the space. As a consequence, training with this loss alone may be slow and present challenges. Accordingly, a perception loss component can be used that encourages the intermediate representations to produce accurate 3D detections and motion forecasting. This can enable the interpretability of the intermediate representations and can enable faster training in example embodiments.

Figure 8:
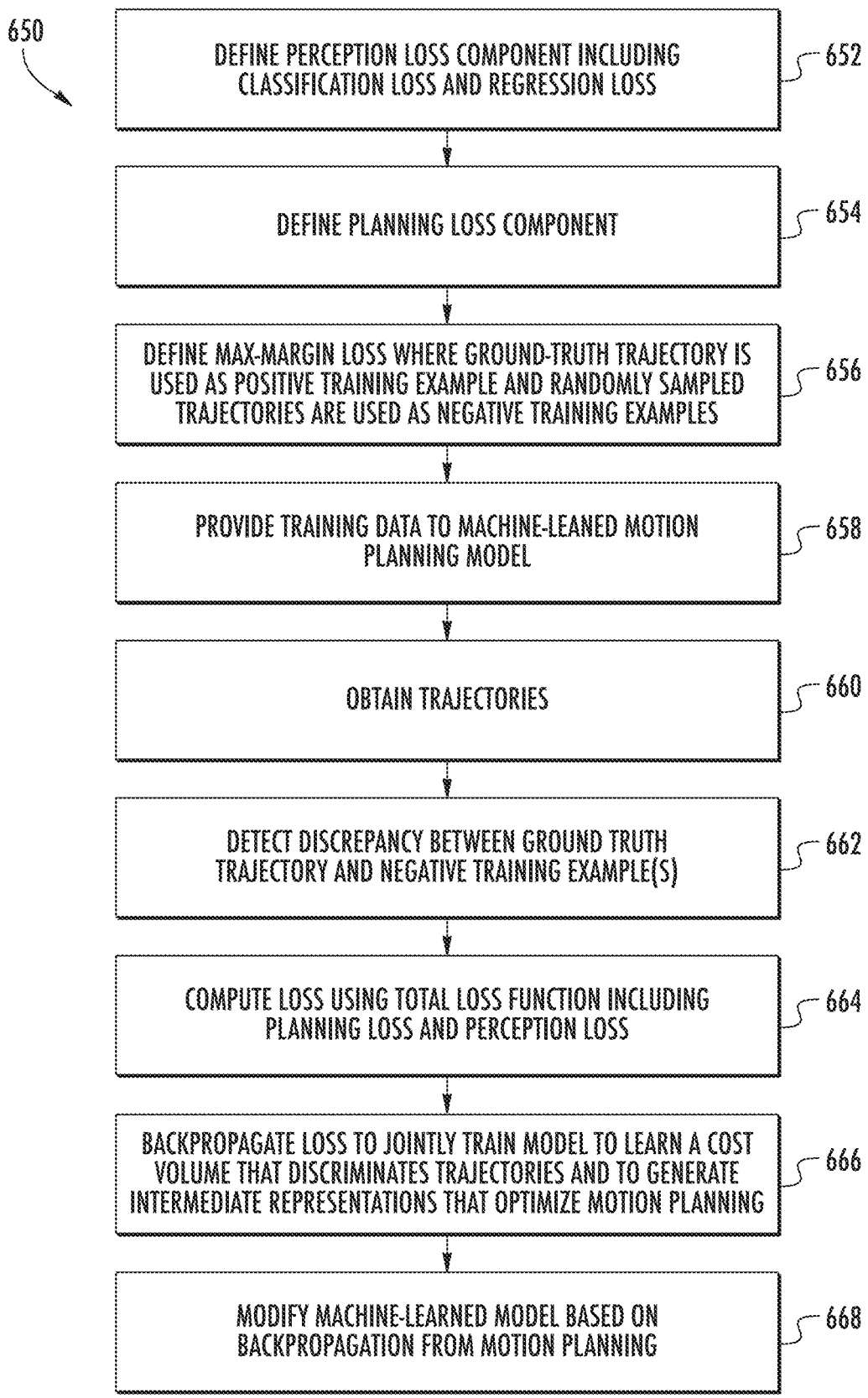
FIG. 8 depicts a flowchart diagram illustrating an example method for training a machine-learned motion planning model to generate target trajectories based on raw sensor data, including an optimization of intermediate representations for motion planning according to example embodiments of the present disclosure.

FIG. 8 depicts a flowchart diagram illustrating an example method 650 of training a machine-learned motion planning model in accordance with example embodiments of the present disclosure. One or more portions of method 650 can be implemented as an algorithm on the hardware components of the devices described herein (e.g., as in FIGS. 1, 2, 3, 4 and 10) to, for example, train a machine-learned motion planning model to generate a target trajectory for an autonomous vehicle based on sensor data and map data. In example embodiments, method 650 may be performed by motion planning system 160 implemented using one or more computing devices of a vehicle computing system (e.g., 110).

At (652), a perception loss component can be defined for the machine learned motion planning model. The perception loss component can include a classification loss component and a regression loss component in example embodiments. The classification loss can be used for distinguishing a vehicle from a background. The perception loss can be used for generating precise object bounding boxes. For each predefined anchor box, the network can output a classification score as well as several regression targets. A classification score $p_{i,j}^k$ can be defined to indicate the probability of existence of a vehicle or other object at a particular anchor. A cross entropy loss can be employed for the classification.

In example embodiments, the cross entropy loss can be defined as set forth in Equation 6.

$$\mathcal{L}_{cla} = \Sigma_{i,j,k}(q_{i,j}{}^k \log p_{i,j}{}^k + (1-q_{i,j}{}^k)\log(1-p_{i,j}{}^k)) \quad (6)$$

In Equation 6, $q_{i,j}{}^k$ can represent the class label for an anchor. For example, $q_{i,j}{}^k$ can be set equal to "1" to represent a vehicle at the anchor, or can be set equal to "0" to represent background at the anchor. The regression outputs can include information such as position, shape, and heading angle at each timeframe t, as set forth in Equations 7, 8, and 9.

$$l_x = \frac{x^a - x^l}{w^l} \quad l_y = \frac{y^a - y^l}{h^l} \quad \text{Equation 7}$$

$$s_w = \log\frac{w^a}{w^l} \quad s_h = \log\frac{h^a}{h^l} \quad \text{Equation 8}$$

$$a_{sin} = \sin(\theta^a - \theta^l) \quad a_{cos} = \cos(\theta^a - \theta^l) \quad \text{Equation 9}$$

In Equations 7, 8, and 9, superscript a can represent an anchor and l can represent a label. A weighted smooth L1 loss over all the inputs can be used. The overall perception loss can be defined as set forth in Equation 10.

$$\mathcal{L}_{perception} = \Sigma(\mathcal{L}_{cla} + a\Sigma_{t=0}{}^T \mathcal{L}_{reg}{}^t) \quad (10)$$

The regression model can be summed over all vehicle correlated anchors, from a current timeframe to a predicted horizon T. In this manner, the model can be taught or trained to predict the position of vehicles in every timeframe.

To find a training label for each anchor, the anchor can be associated with its neighboring ground truth bounding box. For example, all the ground truth boxes with an intersection of union (IoU) higher than 0.4 for each anchor can be used. The highest among the ground truth boxes can be associated with the anchor, and the class label and regression targets can be computed accordingly. In some aspects, any non-assigned ground truth boxes can be associated with their nearest neighbor. The remaining anchors can be treated as background, and may not be considered in the regression loss in some examples. It is noted that one ground truth box may associate to multiple anchors, but that one anchor only is associated with one ground truth box. During training, hard negative mining can be applied to overcome imbalance between positive and negative samples in some examples.

At (654), a planning loss component can be defined. Training a reasonable cost volume can be challenging in the absence of a ground truth cost volume. To overcome such difficulties, a max-margin loss can be utilized to define the planning loss component. The max-margin loss can be minimized, where the ground truth trajectory is used as a positive training example, and randomly sampled trajectories are used as negative training examples. Such training encourages the ground truth trajectory to have the minimal cost, and other trajectories to have higher costs. More specifically, assume a ground truth trajectory $\{(x^t, y^t)\}$ for the next T time steps, where $(x^t, y^t)$ is the position of the autonomous vehicle at the t time step. The cost volume value can be defined as $c_i^t$ the point $(x^t, y^t)$. A number of negative trajectories equal to N can be sampled. The ith negative trajectory can be defined as $\{(x_i^t, y_i^t)\}$ and the cost volume value at these points can be defined as $c_i^t$. The overall max margin loss can be defined as set forth in Equation 11.

$$\mathcal{L}_{costmap} = \sum_{\{(x^t, y^t)\}} \left( \max_{1 \leq i \leq N} \left( \sum_{t=1}^{T} [\hat{c}^t - c_i^t + d_i^t + \gamma_i^t]_+ \right) \right) \quad \text{Equation 11}$$

In Equation 11, the innermost summation denotes the discrepancy between the ground truth trajectory and one negative trajectory sample, which is a sum of per-timestep loss. The notation $[\ ]_+$ represents an ReLU function. This is designed to be inside the summation rather than outside, as it can prevent the cost volume at one time step from dominating the whole loss. The distance between the negative trajectory and the ground truth trajectory can be defined as $d_i^t$. The ground truth trajectory can be defined as $\|(x^t, y^t) - (x_i^t, y_i^t)\|_2$ and can be used to encourage negative trajectories far from the ground truth trajectory to have much higher cost. A traffic rule violation cost can be defined as $y_i^t$. The traffic violation cost in some examples can be a constant only if the negative trajectory t violates traffic rules at time t (e.g., moving before red lights, colliding with other vehicles, etc.). This can be used to determine how 'bad' the negative samples are. As a result, it can penalize those rule-violated trajectories more severely to train the machine-learned motion planning model to avoid dangerous behaviors. After computing the discrepancy between the ground truth trajectory and each negative sample, the worst case can be optimized by the max operation. Optimizing the worst case can encourage the model to learn the cost volume that discriminates good trajectories from bad trajectories.

At (658), training data can be provided to the machine learned motion planning model. The training data can include a number of sets of ground truth data. For example, to train a machine-learned model, a training data set can include a large number of previously obtained representations of input data, as well as corresponding labels that describe corresponding outputs associated with the corresponding input data. A training data set can more particularly include a first portion of data corresponding to one or more representations of input data. The input data can, for example, be recorded or otherwise determined while a vehicle is in navigational operation and/or the like. The training dataset can further include a second portion of data corresponding to labels identifying outputs. The labels included within the second portion of data within the training dataset can be manually annotated, automatically annotated, or annotated using a combination of automatic labeling and manual labeling.

At (658), the computing system can input a first portion of a set of ground-truth data into the machine-learned motion planning model. For example, to train the model, a training computing system can input a first portion of a set of ground-truth data (e.g., the first portion of the training dataset) into the machine-learned model to be trained.

At (660), the computing system can receive as output of the machine-learned model, in response to receipt of the ground-truth data, one or more inferences that predict a second portion of the set of ground-truth data. For example, in response to receipt of a first portion of a set of ground-truth data, the machine-learned model can output a target trajectory. This output of the machine-learned model can predict the remainder of the set of ground-truth data (e.g., the second portion of the training dataset).

At (662), one or more discrepancies between the ground truth trajectory and negative training examples are detected. At (664), the computing system can determine a loss function that compares the predicted inferences generated by the machine-learned model to the second portion of the set of ground-truth data. For example, after receiving such predictions, a training computing system can apply or otherwise determine a loss function that compares the inferences output by the machine-learned model to the remainder of the ground-truth data (e.g., ground-truth labels) which the model attempted to predict. In example embodiments, the loss function can be a total loss that includes a planning loss component and a perception loss component.

At (666), the loss function can be back-propagated to jointly train the model to learn a cost volume that discriminates trajectories, as well as to generate intermediate representations that optimize motion planning. At (668), one or more portions of the machine-learned motion planning model can be modified based on the backpropagation at (666). For example, the machine learned motion planning model can be trained by modifying one or more weights associated with the model. This process of inputting ground-truth data, determining a loss, and backpropagating the loss through the model can be repeated numerous times as part of training the model. For example, the process can be repeated for each of numerous sets of ground-truth data provided within the training dataset.

Figure 9:
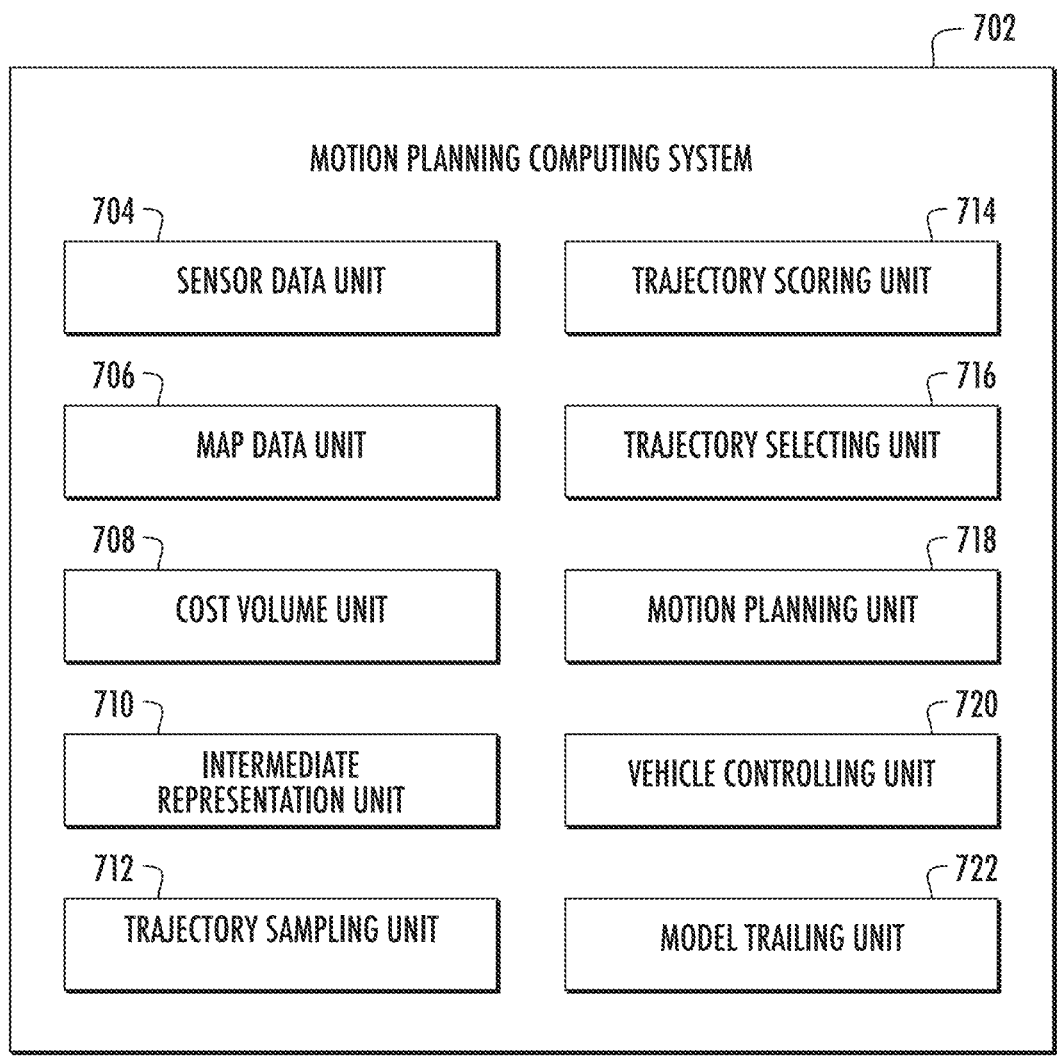
FIG. 9 depicts example system units for performing operations and functions according to example embodiments of the present disclosure.

Various means can be configured to perform the methods and processes described herein. FIG. 9 depicts an example of a computing environment including example means for performing the methods and processes described herein. FIG. 9 depicts an example motion planning computing system 702 with units 704-720 for performing operations and functions according to example embodiments of the present disclosure. For example, motion planning computing system 900 can include one or more sensor data unit(s) 704, one or more map data unit(s) 706, one or more cost volume unit(s) 708, one or more intermediate representation unit(s) 710, one or more trajectory sampling unit(s) 712, one or more trajectory scoring unit(s) 714, one or more trajectory selecting unit (S) 716, one or more motion planning unit(s) 718, one or more vehicle controlling unit(s) 720, and/or other means for performing the operations and functions described herein. In some implementations, one or more of the units 704-720 may be implemented separately. In some implementations, one or more of the units 704-720 may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data such as LIDAR point cloud data associated with an environment external to an autonomous vehicle. The means can be configured to project the LIDAR point cloud data to a bird's eye view representation of the LIDAR point cloud data in some examples. A sensor data unit 704 is one example of a means for obtaining sensor data such as LIDAR point cloud data as described herein.

The means can be configured to obtain map data such as high-definition map data associated with an environment external to an autonomous vehicle. The high-definition map data may include information about the semantics of the environment such as the location of lanes, lane boundaries shape, location of signs, etc. Such semantic information can enable accurate motion planning including driving according to traffic rules. A map data unit 706 is one example of a means for obtaining map data such as high-definition map data as described herein. In some examples, sensor data unit 704 and/or map data unit 706 may include means for obtaining the sensor data and the map data and inputting the sensor data and the map data into a machine learned motion planning model.

The means can be configured to generate a cost volume including data indicative of a cost associated with each of the plurality of future locations of the autonomous vehicle within a planning horizon. A cost volume unit 708 is one example of a means for generating a target trajectory. In some examples, a cost volume unit 708 can be part of a backbone network including a cost volume header that is configured to generate the cost volume based at least in part on sensor data and map data. In some examples, the cost volume header can include a set of one or more convolutional network layers. In some examples, the one or more convolutional network layers of the cost volume header can be optimized based on a selected target trajectory.

The means can be configured to generate one or more intermediate representations associated with at least one of an object detection or an object prediction. An intermediate representation unit 710 is one example of a means for generating one or more intermediate representations associated with at least one of an object detection or an object prediction. In some examples, an intermediate representation unit 710 can be part of a backbone network including a perception header configured to generate the one or more intermediate representations based at least in part on sensor data and map data. In some examples, the one or more intermediate representations can include one or more bounding boxes associated with an object detection and one or more motion predictions associated with the object detection. In some examples, the perception header can include a set of one or more convolutional network layers. In some examples, the one or more convolutional network layers of the perception header can be optimized based on an output of the one or more convolutional network layers of the cost volume header. In some examples, the one or more convolutional network layers of the perception header can be optimized based on a selected target trajectory. In some examples, intermediate representation unit 710 may include a backbone network configured as part of the machine learned motion planning model.

The means can be configured to determine a set of potential trajectories from a plurality of possible trajectories for the autonomous vehicle. A trajectory sampling unit 712 is one example of a means for determining a set of potential trajectories for the autonomous vehicle. In some examples, the trajectory sampling unit 712 may include means for applying a dynamical model to generate the set of potential trajectories according to at least one of a speed constraint, an acceleration constraint, or a turning angle constraint. In some examples, trajectory sampling unit 712 may include a trajectory generator configured as part of a machine learned motion planning model.

The means can be configured to evaluate a set of potential trajectories for the autonomous vehicle and to generate a trajectory score for at least one potential trajectory based at least in part on a cost volume. A trajectory scoring unit 714 is one example of a means for evaluating a set of potential trajectories for the autonomous vehicle and generating a trajectory score for at least one potential trajectory based at least in part on a cost volume. In some examples, trajectory scoring unit 714 can include means that are configured to generate, using a trajectory generator of a machine-learned motion planning model, a respective cost for each of a plurality of potential trajectories. The respective costs for each of the plurality of potential trajectories can be generated based at least in part on the cost volume associated with such potential trajectory.

The means can be configured to select a target trajectory for the autonomous vehicle from one or more potential trajectories based at least in part on the trajectory score for at least one potential trajectory. A trajectory selection unit 716 is one example of a means for selecting a target trajectory for the autonomous vehicle. In some examples, trajectory selection unit 716 can select a target trajectory from a set of potential trajectories based at least in part on the trajectory score for at least one potential trajectory. In some examples, a trajectory selection unit 716 can include means for selecting a target trajectory for an autonomous vehicle from a set of potential trajectories based at least in part on the trajectory score for each of the set of potential trajectories. In some examples, a trajectory selection unit 716 can include means for selecting a target trajectory based on the respective cost for each of a plurality of potential trajectories. In some examples, trajectory selection unit 716 can include means for selecting a target trajectory based on optimizing at least one potential trajectory for the autonomous vehicle based at least in part on the cost volume generated by the backbone network.

The means can be configured to generate one or more motion plans based at least in part on a selected target trajectory. A motion planning unit 718 is one example of a means for generating one or more motion plans based at least in part on the selected target trajectory. The means can be configured to determine a motion plan for the autonomous vehicle that best navigates the autonomous vehicle along a determined travel route relative to the objects at such locations. In some examples, a motion planning unit 718 can include means for receiving a target trajectory for an autonomous vehicle as an output of a machine learned motion planning model.

The means can be configured to control one or more vehicle controls (e.g., actuators or other devices that control gas flow, steering, braking, etc.) to execute the selected motion plan. A vehicle controlling unit 720 is one example of a means for controlling motion of the autonomous vehicle to execute the motion plan. In some examples, a vehicle controlling unit 720 can include means for generating one or more vehicle control signals for the autonomous vehicle based at least in part on the target trajectory.

The means can be configured to train a machine learned motion planning model based at least in part on multitask training with supervision for perception and motion planning. A model training unit 722 is one example of a means for training a machine-learned motion planning model based at least in part on multitask training with supervision for perception of motion planning. In some examples, the model training unit 722 can include means for training a machine-learned motion planning model using a total loss function that includes a perception loss component and a motion planning loss component. In some examples, the perception loss component can include a classification loss associated with distinguishing a vehicle from a background. In some examples, the perception loss component can include a regression loss associated with generating object bounding boxes. In some examples, the motion planning loss component is generated based at least in part on one or more human driven trajectories. In some examples, the machine learned motion planning model is jointly trained for motion planning and generating the intermediate representations based on motion planning optimization.

Figure 10:
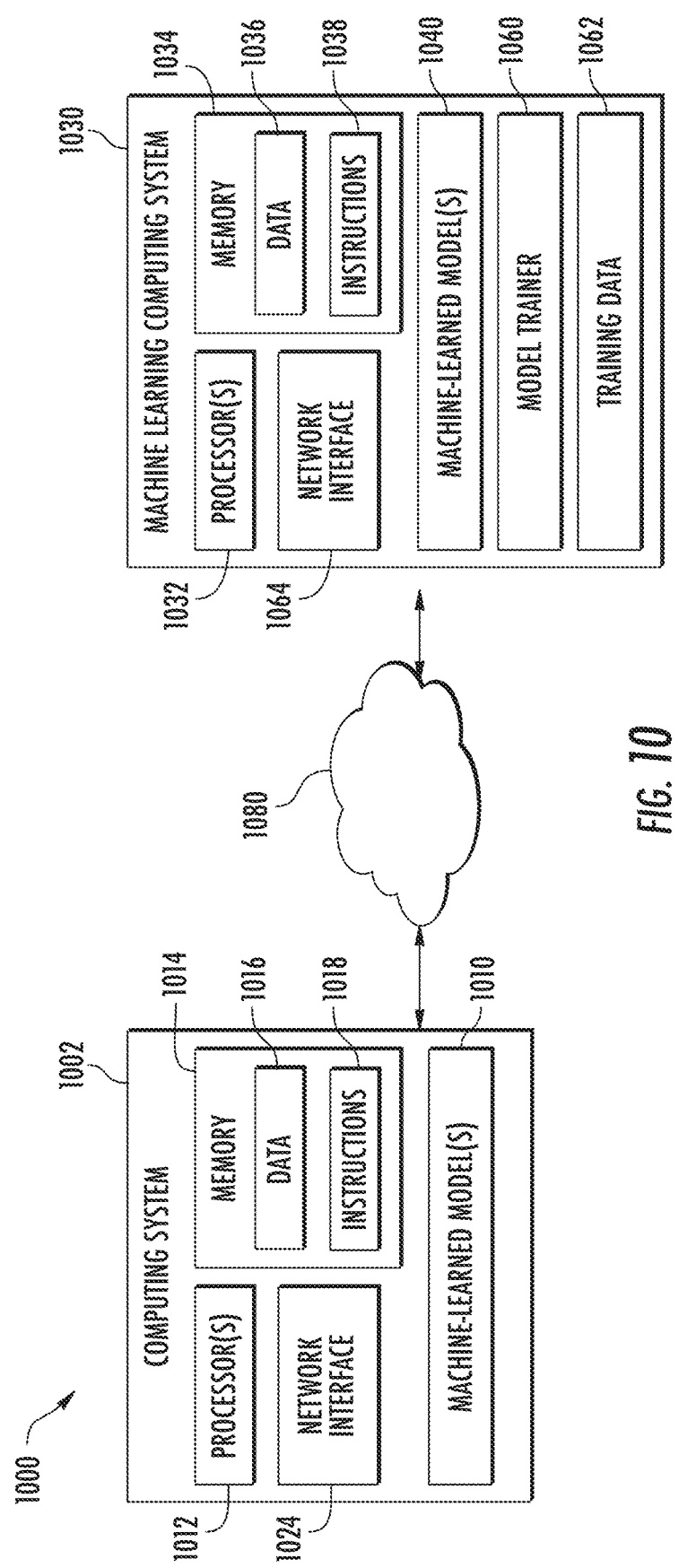
FIG. 10 depicts example system components according to example implementations of the present disclosure.

FIG. 10 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform various operations as part of motion planning for an autonomous vehicle. For example, computing system 1002 can receive sensor data map data associated with an environment external to an autonomous vehicle, and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating motion plans including target trajectories for an autonomous vehicle, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle, comprising:
one or more processors; and
one or more non-transitory computer-readable media that store:
a machine-learned motion planning model configured to receive sensor data and map data associated with an environment external to an autonomous vehicle and process the sensor data and the map data to generate a target trajectory for the autonomous vehicle, the machine-learned motion planning model configured to:
generate, using the sensor data and the map data, a cost volume that indexes, at each of a plurality of timesteps, cost data associated with a plurality of locations in the environment;
select a target trajectory for the autonomous vehicle from a plurality of potential trajectories based on a comparison of the plurality of potential trajectories using the cost data indexed in the cost volume by, for a respective potential trajectory corresponding to waypoints respectively associated with the plurality of timesteps, using the waypoints and the plurality of timesteps to obtain cost data from the cost volume for determining a respective trajectory score; and
instructions that are executable by the one or more processors to cause the one or more processors to perform operations, the operations comprising:
obtaining the sensor data and the map data; and
processing the sensor data and the map data with the machine-learned motion planning model to receive the target trajectory as an output of the machine-learned motion planning model.

2. The autonomous vehicle of claim 1, wherein the machine-learned motion planning model comprises one or more first convolutional network layers that are configured to:
generate one or more intermediate representations associated with at least one of an object detection or an objection prediction based at least in part on the sensor data and the map data.

3. The autonomous vehicle of claim 2, wherein:
the one or more intermediate representations include one or more bounding boxes associated with the object detection and one or more motion predictions associated with the object prediction.

4. The autonomous vehicle of claim 3, wherein the machine-learned motion planning model comprises one or more second convolutional network layers that are configured to:
generate the cost volume based at least in part on the sensor data and the map data.

5. The autonomous vehicle of claim 4, wherein:
the one or more first convolutional network layers are optimized based on an output of the one or more second convolutional network layers.

6. The autonomous vehicle of claim 5, wherein:
the machine-learned motion planning model is trained based at least in part on multitask training with supervision for perception and motion planning.

7. The autonomous vehicle of claim 6, wherein:
the machine-learned motion planning model is trained using a total loss function that includes a perception loss component and a motion planning loss component.

8. The autonomous vehicle of claim 7, wherein the perception loss component includes:

a classification loss associated with distinguishing a vehicle from a background; and a regression loss associated with generating object bounding boxes.

9. The autonomous vehicle of claim 8, wherein:

the motion planning loss component is generated based at least in part on one or more human-driven trajectories.

10. The autonomous vehicle of claim 1, wherein the machine-learned motion planning model is configured to generate the cost volume with a backbone network that outputs the cost volume to a trajectory generator that selects the target trajectory.

11. The autonomous vehicle of claim 2, wherein the output of the machine-learned motion planning model is a first output, the operations further comprising:

receiving the one or more intermediate representations as a second output of the machine-learned motion planning model.

12. The autonomous vehicle of claim 2, wherein:

the machine-learned motion planning model is jointly trained for motion planning and generating the intermediate representations based on motion planning optimization.

13. The autonomous vehicle of claim 1, wherein:

the operations further comprise generating one or more vehicle control signals for the autonomous vehicle based at least in part on the target trajectory.

14. The autonomous vehicle of claim 1, wherein using the waypoints and the plurality of timesteps to obtain cost data from the cost volume for determining the respective trajectory score comprises:

obtaining cost values for the waypoints by, for a respective timestep of the plurality of timesteps that is associated with a respective waypoint of the waypoints, applying a respective filter to the cost volume and obtaining, from the filtered cost volume, a respective value associated with the respective waypoint, and combining the cost values to obtain the respective trajectory score.

15. The autonomous vehicle of claim 1, wherein the machine-learned motion planning model is configured to select the target trajectory by optimizing at least one of the plurality of potential trajectories for the autonomous vehicle based at least in part on the cost volume.

16. One or more non-transitory computer-readable media that store a machine-learned motion planning model, the machine-learned motion planning model configured to:

receive sensor data and map data associated with an environment external to an autonomous vehicle;

generate, using the sensor data and the map data, a cost volume that indexes, at each of a plurality of timesteps, cost data associated with a plurality of locations in the environment; and select a target trajectory for the autonomous vehicle from a plurality of potential trajectories based on a comparison of the plurality of potential trajectories using the cost data indexed in the cost volume by, for a respective potential trajectory corresponding to waypoints respectively associated with the plurality of timesteps, using the waypoints and the plurality of timesteps to obtain cost data from the cost volume for determining a respective trajectory score.

17. The one or more non-transitory computer-readable media of claim 16, wherein:

the machine-learned motion planning model comprises:

one or more first convolutional network layers configured to generate one or more intermediate representations based at least in part on the sensor data and the map data; and one or more second convolutional network layers configured to generate the cost volume based at least in part on the sensor data and the map data.

18. A computer-implemented method of motion planning for an autonomous vehicle, the method comprising:

obtaining sensor data and map data associated with an environment external to the autonomous vehicle;

generating, using a machine-learned motion planning model and based on the sensor data and the map data, a cost volume that indexes, at each of a plurality of timesteps, cost data associated with a plurality of locations in the environment; and selecting, using the machine-learned motion planning model, a target trajectory for the autonomous vehicle from a plurality of potential trajectories based on a comparison of the plurality of potential trajectories using the cost data indexed in the cost volume by, for a respective potential trajectory corresponding to waypoints respectively associated with the plurality of timesteps, using the waypoints and the plurality of timesteps to obtain cost data from the cost volume for determining a respective trajectory score.

19. The computer-implemented method of claim 18, wherein selecting the target trajectory for the autonomous vehicle comprises:

comparing a plurality of trajectory scores respectively associated with the plurality of potential trajectories.

20. The autonomous vehicle of claim 1, wherein the cost volume comprises precomputed scores for the plurality of locations at the plurality of timesteps.

* * * * *